US012812486B2

(12) United States Patent
Park et al.

(10) Patent No.: US 12,812,486 B2
(45) Date of Patent: Nov. 24, 2026

(54) HYBRID MEASUREMENTS AND REPORTING FOR LAYER 1/LAYER 2 TRIGGERED MOBILITY

(71) Applicant: QUALCOMM Incorporated, San Diego, CA (US)

(72) Inventors: Changhwan Park, San Diego, CA (US); Jelena Damnjanovic, Del Mar, CA (US); Yan Zhou, San Diego, CA (US); Tao Luo, San Diego, CA (US); Hari Sankar, San Diego, CA (US); Jae Ho Ryu, San Diego, CA (US); Yongle Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 297 days.

(21) Appl. No.: 18/625,986

(22) Filed: Apr. 3, 2024

(65) Prior Publication Data

US 2024/0340734 A1 Oct. 10, 2024

Related U.S. Application Data

(60) Provisional application No. 63/494,910, filed on Apr. 7, 2023.

(51) Int. Cl.
*H04W 4/00* (2018.01)
*H04W 36/00* (2009.01)
*H04W 36/04* (2009.01)

(52) U.S. Cl.
CPC ....... *H04W 36/04* (2013.01); *H04W 36/0058* (2018.08); *H04W 36/008355* (2023.05)

(58) Field of Classification Search
CPC ............. H04W 36/04; H04W 36/0085; H04W 36/0058; H04W 36/008355;
(Continued)

(56) References Cited

U.S. PATENT DOCUMENTS

2024/0340981 A1* 10/2024 Karimidehkordi .......................... H04W 56/0045
2025/0365594 A1* 11/2025 Da Silva ............... H04W 24/10
2025/0374137 A1* 12/2025 Wallentin .......... H04W 36/0005

FOREIGN PATENT DOCUMENTS

WO 2019062567 A1 4/2019
WO 2022084961 A1 4/2022
(Continued)

OTHER PUBLICATIONS

International Search Report and Written Opinion—PCT/US2024/023031—ISA/EPO—Jul. 11, 2024.

*Primary Examiner* — Phuoc H Doan
(74) *Attorney, Agent, or Firm* — HARRITY & HARRITY, LLP

(57) ABSTRACT

Various aspects of the present disclosure generally relate to wireless communication and more particularly to hybrid measurements and reporting for Layer 1 (L1)/Layer 2 (L2) triggered mobility (LTM). Some aspects more specifically relate to a UE performing filtered measurements of one or more LTM candidate cells. In some aspects, the hybrid measurements and reporting may be associated with measurements using Layer 3 type measurements and reporting using L1 type reports for LTM. In some aspects, one or more cells, from the one or more LTM candidate cells, may be selected (for example, by the UE or by a network node) for L1 measurement or reporting associated with the filtered measurement values. In some aspects, the UE may transmit an L1 measurement report indicating L1 measurement values of the one or more cells. A network node may perform one or more operations in response to the L1 measurement values.

16 Claims, 12 Drawing Sheets

(58) Field of Classification Search
CPC ........... H04W 36/0094; H04W 56/005; H04W 76/20; H04L 1/1812
See application file for complete search history.

(56) References Cited

FOREIGN PATENT DOCUMENTS

| | | | |
|---|---|---|---|
| WO | 2022151077 | A1 | 7/2022 |
| WO | 2022151208 | A1 | 7/2022 |
| WO | 2022206801 | A1 | 10/2022 |
| WO | 2022236701 | A1 | 11/2022 |
| WO | 2022240104 | A1 | 11/2022 |

* cited by examiner

500

HYBRID MEASUREMENTS AND REPORTING FOR LAYER 1/LAYER 2 TRIGGERED MOBILITY

CROSS-REFERENCE TO RELATED APPLICATION

This Patent Applications claims priority to U.S. Provisional Patent Application No. 63/494,910, filed on Apr. 7, 2023, entitled "HYBRID MEASUREMENTS AND REPORTING FOR LAYER 1/LAYER 2 TRIGGERED MOBILITY," and assigned to the assignee hereof. The disclosure of the prior Applications is considered part of and is incorporated by reference into this Patent Applications.

FIELD OF THE DISCLOSURE

Aspects of the present disclosure generally relate to wireless communication and specifically, to techniques and apparatuses for hybrid measurements and reporting for Layer 1/Layer 2 triggered mobility (LTM).

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the Third Generation Partnership Project (3GPP). NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

As described herein, a wireless network may support Layer 1 and/or Layer 2 (L1/L2) triggered mobility (LTM) to enable fast connected mode mobility that may reduce data interruption relative to Layer 3 (L3) triggered mobility by reducing radio resource control (RRC) signaling and associated processing delays and/or by reducing downlink synchronization and/or random access channel (RACH) procedure times. For example, in L3 triggered mobility, an RRC configuration for a target cell may be transmitted to a UE, and the UE may be reconfigured to communicate with the target cell based on the RRC configuration. Accordingly, one potential approach to reducing data interruption due to L3 mobility may be to provide the RRC configuration in advance to reduce a downlink synchronization and/or RACH procedure time. For example, in an existing L3 handover procedure, the UE may first establish downlink synchronization and then establish uplink synchronization on the target cell via a contention-free random access (CFRA) procedure on the target cell before access link communications can be enabled on the target cell. However, LTM may be associated with the UE maintaining both downlink synchronization and uplink synchronization for each LTM candidate cell (for example, because the UE does not know which LTM candidate cell will be selected as the target cell for handover). Maintaining both downlink synchronization and uplink synchronization for each LTM candidate cell is associated with a large processing overhead and/or signaling overhead. In some examples, the UE may be limited (for example, due to a capability of the UE) as to a quantity of cells (or reference signals corresponding to respective cells) for which the UE can maintain downlink synchronization and uplink synchronization.

SUMMARY

Some aspects described herein relate to an apparatus for wireless communication at a user equipment (UE). The apparatus may include one or more memories storing processor-executable code and one or more processors coupled with the one or more memories. At least one processor of the one or more processors may be configured to cause the UE to receive, from a network node, an indication of a first one or more Layer 1/Layer 2 triggered mobility (LTM) candidate cells to be measured from a set of one or more cells configured for Layer 1/Layer 2 mobility. At least one processor of the one or more processors may be configured to cause the UE to identify one or more filtered measurement values associated with respective cells from the first one or more LTM candidate cells. At least one processor of the one or more processors may be configured to cause the UE to transmit, to the network node, a Layer 1 measurement report indicating one or more measurement values associated with a second one or more LTM candidate cells that are selected from the first one or more LTM candidate cells in association with the one or more filtered measurement values.

Some aspects described herein relate to an apparatus for wireless communication at a network node. The apparatus may include one or more memories storing processor-executable code and one or more processors coupled with the one or more memories. At least one processor of the one or more processors may be configured to cause the network node to transmit an indication, for a UE, of a first one or more LTM candidate cells to be measured from a set of one or more cells configured for Layer 1/Layer 2 mobility. At least one processor of the one or more processors may be configured to cause the network node to receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

Some aspects described herein relate to a method of wireless communication performed at a UE. The method may include receiving, from a network node, an indication of a first one or more LTM candidate cells to be measured from a set of one or more cells configured for Layer 1/Layer 2 mobility. The method may include identifying one or more filtered measurement values associated with respective cells from the first one or more LTM candidate cells. The method may include transmitting, to the network node, a Layer 1 measurement report indicating one or more measurement values associated with a second one or more LTM candidate cells that are selected from the first one or more LTM candidate cells in association with the one or more filtered measurement values.

Some aspects described herein relate to a method of wireless communication performed at a network node. The method may include transmitting an indication, for a UE, of a first one or more LTM candidate cells to be measured from a set of one or more cells configured for Layer 1/Layer 2 mobility. The method may include receiving a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

Some aspects described herein relate to a non-transitory computer-readable medium that stores a set of instructions for wireless communication. The set of instructions, when executed at a UE, may cause the UE to receive, from a network node, an indication of a first one or more LTM candidate cells to be measured from a set of one or more cells configured for Layer 1/Layer 2 mobility. The set of instructions, when executed at the UE, may cause the UE to identify one or more filtered measurement values associated with respective cells from the first one or more LTM candidate cells. The set of instructions, when executed at the UE, may cause the UE to transmit, to the network node, a Layer 1 measurement report indicating one or more measurement values associated with a second one or more LTM candidate cells that are selected from the first one or more LTM candidate cells in association with the one or more filtered measurement values.

Some aspects described herein relate to a non-transitory computer-readable medium that stores a set of instructions for wireless communication. The set of instructions, when executed at a network node, may cause the network node to transmit an indication, for a UE, of a first one or more LTM candidate cells to be measured from a set of one or more cells configured for Layer 1/Layer 2 mobility. The set of instructions, when executed at the network node, may cause the network node to receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

Some aspects described herein relate to an apparatus for wireless communication. The apparatus may include means for receiving, from a network node, an indication of a first one or more LTM candidate cells to be measured from a set of one or more cells configured for Layer 1/Layer 2 mobility. The apparatus may include means for identifying one or more filtered measurement values associated with respective cells from the first one or more LTM candidate cells. The apparatus may include means for transmitting, to the network node, a Layer 1 measurement report indicating one or more measurement values associated with a second one or more LTM candidate cells that are selected from the first one or more LTM candidate cells in association with the one or more filtered measurement values.

Some aspects described herein relate to an apparatus for wireless communication. The apparatus may include means for transmitting an indication, for a UE, of a first one or more LTM candidate cells to be measured from a set of one or more cells configured for Layer 1/Layer 2 mobility. The apparatus may include means for receiving a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
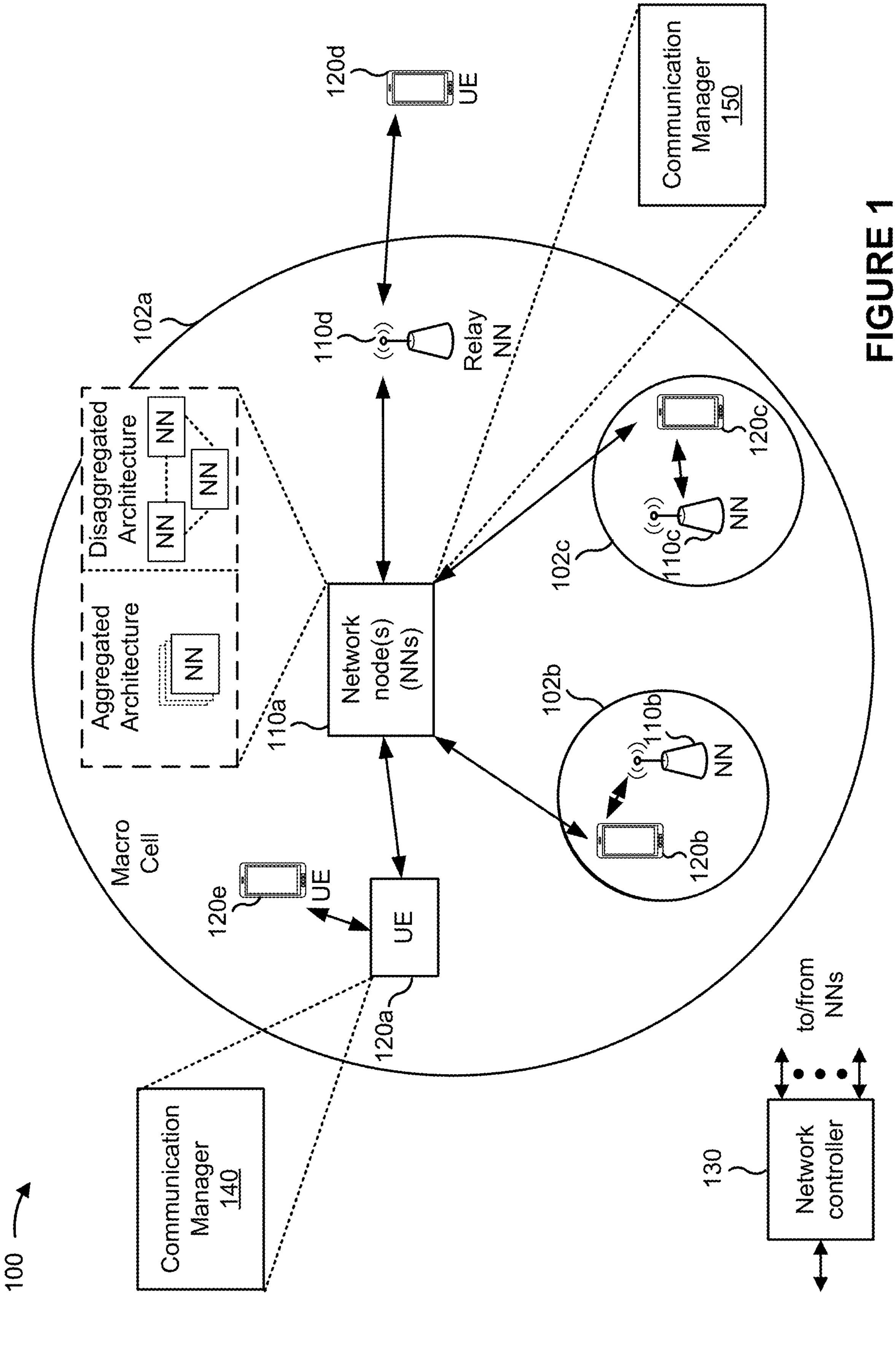
FIG. 1 is a diagram illustrating an example of a wireless network.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some wireless networks, a radio resource control (RRC) layer handles communications related to configuring and operating a user equipment (UE). The RRC layer in an NR protocol stack may be referred to as "Layer 3" or "L3". L3 measurements are useful for radio resource management decisions that use a long term view of channel conditions. L3 measurements may be filtered (for example, time domain filtered) at the L3 layer to remove the impact of fast fading (signal distortion occurs quickly in comparison to a time duration of a symbol) and to help reduce short term variations in signal strength or delay. For example, a UE may apply one or more filter coefficients (for example, weights) to a most recent measurement (for example, a beam-level measurement) and one or more previous measurements (for example, a previous L3 measurement value) to obtain an L3 measurement value. Handover procedures may be triggered after L3 filtering to reduce the risk of ping-ponging between serving cells. L3 measurements may be either beam-level or cell-level and may be reported to the network within an RRC message as a measurement report. A UE may perform an L3 measurement and report the L3 measurement to the network. An L3 measurement report may be an RRC report (for example, that may be obtained by an RRC entity or an RRC layer of a network node).

A physical (PHY) layer may be referred to as "Layer 1" or "L1". L1 measurements may provide instantaneous measurement values of channel conditions. An L1 measurement report may be obtained by a PHY layer or a medium access control (MAC) layer of a network node. The UE may obtain an L1 measurement value by applying L1 filtering (for example, which removes an impact of noise associated with the measurement), whereas L3 filtering may remove fast fading or reduce short term variations in the measurement. For example, L3 measurements may provide a longer term view of channel conditions, whereas L1 measurements may provide a shorter term view of channel conditions (for example, with less latency than an L3 measurement). However, L1 measurements may be associated with a higher level of variance (for example, because only L1 filtering is applied and L3 filtering is not applied). Additionally, a UE may perform L1 measurements using a refined or narrow beam. Therefore, to perform L1 measurements, the UE may perform beamforming and/or beam training to identify and/or refine the beam(s) to be used to perform the L1 measurements. The UE may perform L3 measurements using a wide beam or an unrefined beam (for example, a beam with a larger angular spread in the spatial domain as compared to a beam used for L1 measurements). For example, the UE may perform L3 measurements without fine tuning of measurement resources (for example, for time or frequency synchronization) and/or without performing receive (Rx) beamforming.

In some examples, a wireless network may support L1/Layer 2 triggered mobility (LTM) to enable fast connected mode mobility that may reduce data interruption relative to L3 triggered mobility by reducing RRC signaling and associated processing delays and/or by reducing downlink synchronization and/or uplink synchronization times. For example, a UE may perform a cell switch via dynamic control signaling at lower layers (for example, downlink control information (DCI) for L1 signaling or a MAC control element (MAC-CE) for Layer 2 (L2) signaling), such as via L1/L2-centric inter-cell mobility, rather than semi-static L3 RRC signaling to reduce latency, reduce overhead, and/or otherwise increase efficiency of the cell switch. A UE and a network node may communicate on an access link using directional links (for example, using high-dimensional phased arrays) to benefit from a beamforming gain and/or to maintain acceptable communication quality. The directional links, however, typically require fine alignment of transmit and receive beams, which may be achieved through a set of operations referred to as beam management, beam refinement, beam training, and/or beam selection, among other examples. The time for fine time tracking and acquiring full timing information of a target cell may be reduced by requesting that a UE maintain downlink synchronization and/or uplink synchronization for one or more LTM candidate cells configured for LTM prior to an LTM trigger. The UE may maintain both downlink synchronization and uplink synchronization for each LTM candidate cell by performing L1 measurements and/or beam refinement for each LTM candidate cell (for example, because the UE does not know which LTM candidate cell will be selected as the target cell for LTM-based handover). Maintaining both downlink synchronization and uplink synchronization for each LTM candidate cell may be associated with a large processing overhead and/or signaling overhead because the UE performs L1 measurements for each LTM candidate cell that may be associated with fine tuning of time domain synchronization, frequency domain synchronization, and/or receive beam training.

Various aspects relate generally to wireless communication and more particularly to hybrid measurements and reporting for LTM. Some aspects more specifically relate to a UE performing filtered measurements of one or more LTM candidate cells (for example, LTM candidate cells that are RRC configured as candidate cells for LTM-based handover). In some aspects, the filtered measurements may be similar to L3 measurements (for example, the filtered measurements may be associated with filter coefficients for time domain filtering in a similar manner as L3 measurements). In some aspects, the hybrid measurements and reporting may be associated with measurements using L3 type measurements and reporting (for example, of the L3 type measurements) using L1 type reports (for example, may be reported using Layer 1 signaling or L2 signaling). The measurements and reporting described herein may be "hybrid" in that the UE may obtain filtered measurement values (for example, in a similar manner as L3 type measurements) and may report, or perform operations associated with, the filtered measurement values via a lower layer, such as L2 or L1. In some aspects, the measurements and reporting described herein may be "hybrid" in that the UE may obtain filtered measurement values, may select cell(s) for L1 measurements based on, or otherwise associated with, the filtered measurement values, and may transmit a L1 measurement report indicating L1 measurements of the selected cell(s).

In some aspects, one or more cells, from the one or more LTM candidate cells, may be selected (for example, by the UE or by a network node) for LTM-based L1 measurement and/or reporting based on, in response to, or otherwise associated with the filtered measurement values. The UE may perform L1 measurements of the one or more cells to facilitate LTM. In some aspects, the UE may transmit an L1 measurement report indicating L1 measurement values of the one or more cells. A network node (for example, a distributed unit (DU)) may perform one or more operations based on, in response to, or otherwise associated with the L1 measurement values, such as transmitting an LTM handover command (for example, an L1 or an L2 command indicating that the UE is to switch to a cell from the one or more cells).

In some aspects, prior to performing or identifying the L1 measurements of the one or more cells, the UE may transmit a measurement report indicating the filtered measurements of one or more LTM candidate cells. The measurement report (for example, indicating filtered measurement values similar to L3 measurement values) may be associated with an L1 report format. For example, the measurement report (for example, indicating filtered measurement values similar to L3 measurement values) may be associated with L1 or L2. In some aspects, a MAC layer of a network node (for example, a DU) may obtain the measurement report. In such examples, the network node (for example, the DU) may transmit, and the UE may receive, an indication of the one or more cells to be associated with L1 measurements (for example, selected by the network node based on, or otherwise associated with, the filtered measurement values). In some other aspects, prior to performing or identifying the L1 measurements of the one or more cells, the UE may select (for example, autonomously) the one or more cells for LTM-based L1 measurements and reporting based on, or otherwise associated with, the filtered measurement values. In such examples, the UE may transmit the L1 measurement report indicating the L1 measurement values of the one or more cells without receiving an indication of the one or more cells (for example, to be measured at L1 for LTM) from a network node.

Particular aspects of the subject matter described in this disclosure can be implemented to realize one or more of the following potential advantages. In some examples, the described techniques can be used to reduce a processing and/or signaling overhead associated with LTM. For example, by enabling the UE to perform filtered measurements of the one or more LTM candidate cells, the processing overhead associated with LTM may be reduced because the UE may not perform fine tuning of time domain and/or frequency domain synchronization, and/or beam training or beamforming to perform the filtered measurements. As a result, the UE may be enabled to measure an increased quantity of LTM candidate cells (for example, compared to a scenario in which the UE performs L1 measurements for all of the LTM candidate cells). This improves LTM for the UE because an increased quantity of cells may be measured, tracked, and/or maintained for L1/L2-centric inter-cell mobility, thereby enabling uplink and/or downlink channels for link(s) of the increased quantity of cells to be immediately usable for traffic as soon as an LTM handover procedure is completed. Further, by performing the filtered measurement values described herein, an LTM-based operations may be performed for an increased quantity of cells, thereby enabling power control (for example, downlink power control and/or uplink power control) to be seamlessly applied or determined for LTM handovers, thereby reducing a delay that would have otherwise been associated with performing operations associated with determining the power control after the handover is completed.

Further, by transmitting a measurement report indicating the filtered measurements using an L1 report format, a latency associated with reporting and/or selecting the cell(s) for L1 measurements for LTM may be reduced. For example, typically, L3 measurements are reported to L3 (for example, the RRC layer) of a network node (for example, of a central unit (CU)). By providing the filtered measurements (for example, similar to L3 measurements) using an L1 report format, a lower layer (for example, a MAC layer) of the network node (for example, of a DU) may obtain and analyze the measurement results. This reduces a latency that would have otherwise been associated with the UE transmitting the filtered measurements of the one or more LTM candidate cells to L3 of a network node (for example, to an RRC layer of a CU), the L3 of the network node providing an indication of selected cells to the lower layer (for example, a MAC layer) of the network node (for example, from the CU to a DU), and the DU providing the indication of the selected cells to the UE (for example, via a radio unit (RU) or directly to the UE). As another example, by the UE selecting (for example, autonomously) the one or more cells for LTM-based L1 measurements, latency may be reduced that would have otherwise been associated with the UE waiting for an indication (for example, from the network node) of the one or more cells for LTM-based L1 measurements. Further, this conserves network resources (for example, time domain resources and/or frequency domain resources) that would have otherwise been used to transmit a measurement report of the one or more filtered measurement values.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more CUs, one or more DUs, or one or more RUs).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

In some aspects, a CU may host one or more higher layer control functions (for example, higher layers). For example, a CU may host an RRC layer, a packet data convergence protocol (PDCP) layer, and/or a service data adaptation protocol (SDAP) layer, among other examples. Each control function can be implemented with an interface configured to communicate signals with other control functions hosted by the CU. A DU may correspond to a logical unit that includes one or more base station functions to control the operation of one or more RUs. In some aspects, the DU may host one or more of a radio link control (RLC) layer, a MAC layer, and/or one or more high PHY layers depending, at least in part, on a functional split, such as a functional split defined by the 3GPP. An RU may implement lower-layer functionality. In some deployments, an RU, controlled by a DU, may correspond to a logical node that hosts radio frequency (RF) processing functions or low-PHY layer functions.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium. Some UEs 120 (for example, UEs 102*a* and 120*c*) may communicate directly using one or more sidelink channels (for example, without a network node as an intermediary to communicate with one another).

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using for example a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-vehicle (V2N2V) protocol for example by communicating through a Uu interface using the LTE and/or NR uplink and downlink.

In some aspects, the UE 120 may include a communication manager 140. As described in more detail elsewhere herein, the communication manager 140 may receive, from a network node, an indication of a first one or more LTM candidate cells to be measured from a set of one or more cells configured for Layer 1/Layer 2 mobility; identify one or more filtered measurement values associated with respective cells from the first one or more LTM candidate cells; and transmit, to the network node, a Layer 1 measurement report indicating one or more measurement values associated with a second one or more LTM candidate cells that are selected from the first one or more LTM candidate cells in association with the one or more filtered measurement values. Additionally or alternatively, the communication manager 140 may perform one or more other operations described herein.

In some aspects, the network node 110 may include a communication manager 150. As described in more detail elsewhere herein, the communication manager 150 may transmit an indication, for a UE, of a first one or more LTM candidate cells to be measured from a set of one or more cells configured for Layer 1/Layer 2 mobility; and receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells. Additionally or alternatively, the communication manager 150 may perform one or more other operations described herein.

Figure 2:
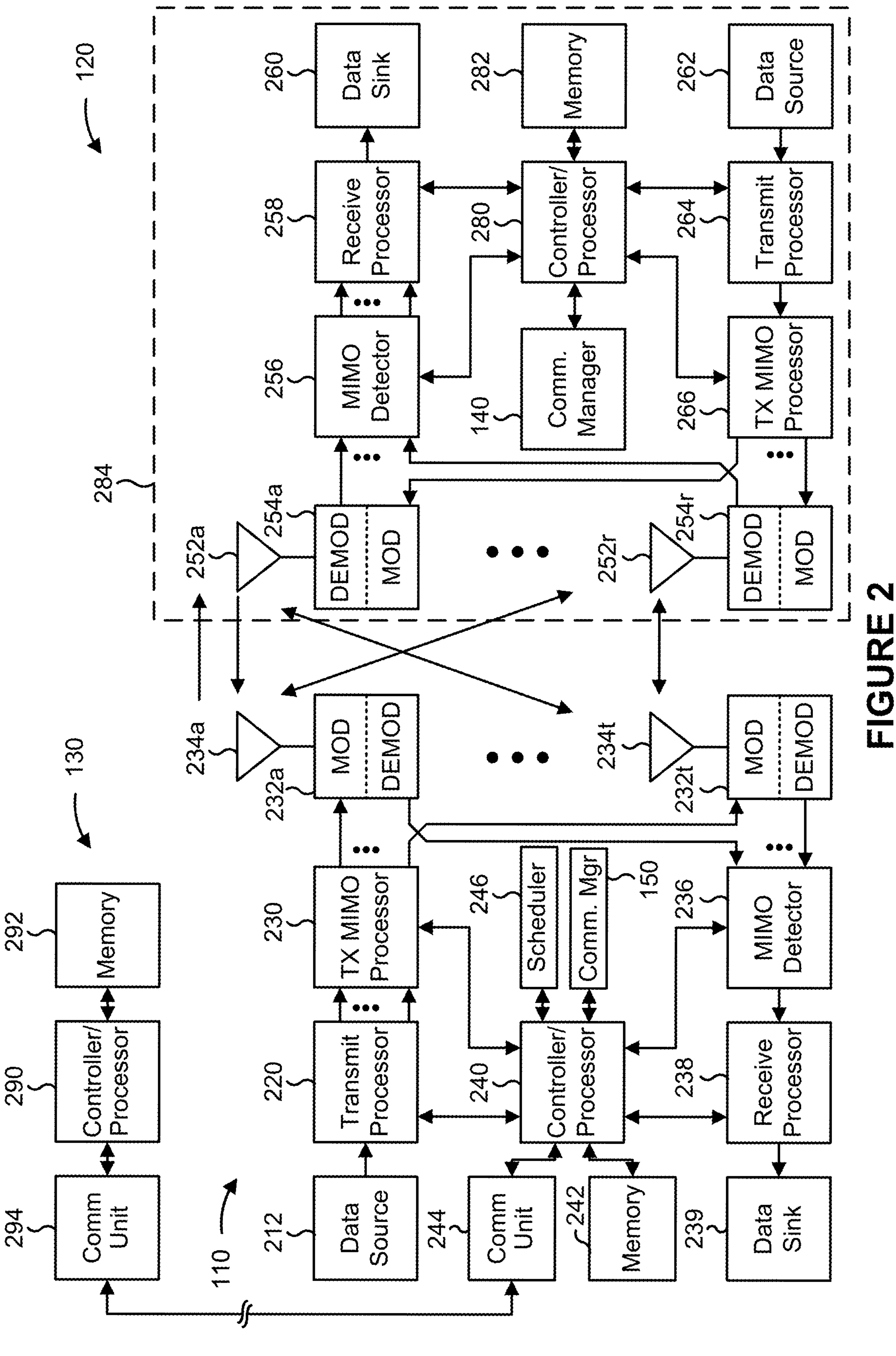
FIG. 2 is a diagram illustrating an example network node in communication with a user equipment (UE) in a wireless network.

FIG. 2 is a diagram illustrating an example network node in communication with a UE in a wireless network. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with hybrid measurements and reporting for LTM, as described in more detail elsewhere herein. For example, the controller/processor 240 of the network node 110, the controller/processor 280 of the UE 120, or any other component(s) of FIG. 2 may perform or direct operations of, for example, process 900 of FIG. 9, process 1000 of FIG. 10, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, the UE 120 includes means for receiving, from a network node, an indication of a first one or more LTM candidate cells to be measured from a set of one or more cells configured for Layer 1/Layer 2 mobility; means for identifying one or more filtered measurement values associated with respective cells from the first one or more LTM candidate cells; and/or means for transmitting, to the network node, a Layer 1 measurement report indicating one or more measurement values associated with a second one or more LTM candidate cells that are selected from the first one or more LTM candidate cells in association with the one or more filtered measurement values. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication, for a UE, of a first one or more LTM candidate cells to be measured from a set of one or more cells configured for Layer 1/Layer 2 mobility; and/or means for receiving a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
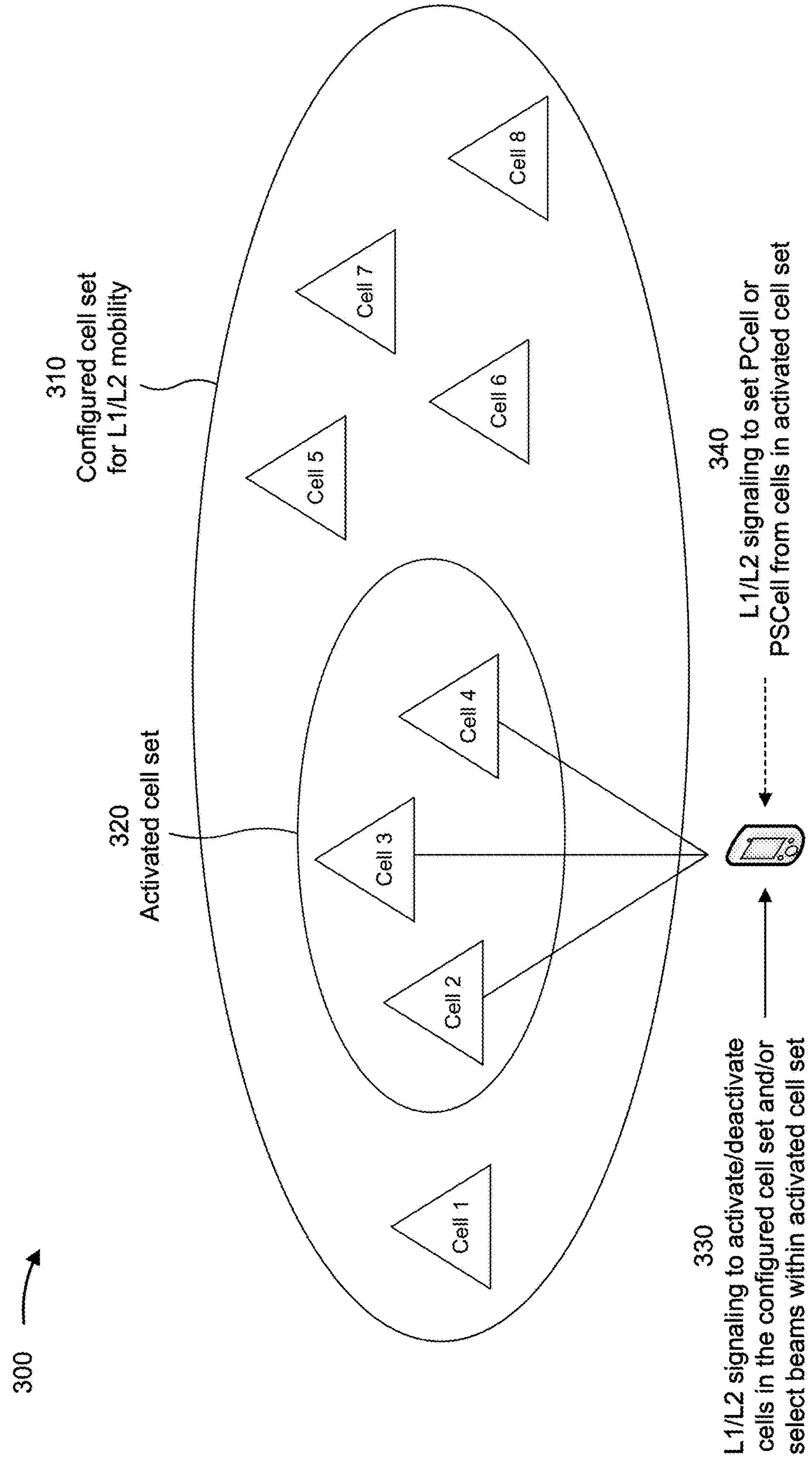
FIG. 3 is a diagram illustrating an example of Layer 1/Layer 2 inter-cell mobility, in accordance with the present disclosure.

FIG. 3 is a diagram illustrating an example of L1/L2 inter-cell mobility 300, in accordance with the present disclosure.

In a wireless network, a UE and a network node may communicate on an access link using directional links (for example, using high-dimensional phased arrays) to benefit from a beamforming gain and/or to maintain acceptable communication quality. The directional links, however, typically require fine alignment of transmit and receive beams, which may be achieved through a set of operations referred to as beam management and/or beam selection, among other examples. Further, a wireless network may support multi-beam operation at relatively high carrier frequencies (for example, within FR2 or FR4), which may be associated with harsher propagation conditions than comparatively lower carrier frequencies. For example, relative to a sub-6 gigahertz (GHz) band (for example, FR1), signals propagating in a millimeter wave frequency band may suffer from increased pathloss and severe channel intermittency, and/or may be blocked by objects commonly present in an environment surrounding the UE (for example, a building, a tree, and/or a body of a user, among other examples). Accordingly, beam management is particularly important for multi-beam operation in a relatively high carrier frequency.

One possible enhancement for multi-beam operation at higher carrier frequencies is to facilitate efficient (for example, low latency and low overhead) downlink and/or uplink beam management to support higher L1/L2-centric inter-cell mobility. Accordingly, L1/L2-centric inter-cell mobility may enable a UE to perform a cell switch via dynamic control signaling at lower layers (for example, DCI for L1 signaling or a MAC-CE for L2 signaling) rather than semi-static Layer 3 (L3) RRC signaling to reduce latency, reduce overhead, and/or otherwise increase efficiency of the cell switch. For example, FIG. 3 illustrates an example of an L1/L2 inter-cell mobility technique, which may be referred to as serving cell-based inter-cell mobility, among other examples. As described in further detail herein, the L1/L2 inter-cell mobility technique may enable a network node to use L1/L2 signaling (for example, DCI or a MAC-CE) to indicate control information associated with an activated cell set and/or a deactivated cell set and/or to indicate a change to a special cell (SpCell) within the activated cell set, where an SpCell may be a primary cell (PCell) or a primary secondary cell (PSCell).

For example, as shown in FIG. 3, L1/L2 inter-cell mobility may use mechanisms that are generally similar to carrier aggregation, except that different cells that are configured for L1/L2 inter-cell mobility may be on the same carrier frequency. As shown in FIG. 3, a network node may configure a cell set 310 for L1/L2 inter-cell mobility (for example, using RRC signaling). As further shown, an activated cell set 320 may include one or more cells in the configured cell set 310 that are activated and ready to use for data and/or control transfer. Accordingly, in the L1/L2 inter-cell mobility technique shown in FIG. 3, a deactivated cell set may include one or more cells that are included in the cell set 310 configured for L1/L2 inter-cell mobility but are not included in the activated cell set 320. However, the cells that are in the deactivated cell set can be readily activated, and thereby added to the activated cell set 320, using L1/L2 signaling. Accordingly, in a first operation 330, L1/L2 signaling can be used for mobility management of the activated cell set 320. For example, in some examples, L1/L2 signaling can be used to activate cells within the configured cell set 310 (for example, to add cells to the activated cell set 320), to deactivate cells in the activated cell set 320, and/or to select beams within the cells included in the activated cell set 320. In this way, the L1/L2 inter-cell mobility technique shown in FIG. 3 may enable seamless mobility among the cells included in the activated cell set 320 using L1/L2 signaling (for example, using beam management techniques).

Furthermore, in a second operation 340, the L1/L2 inter-cell mobility technique may use L1/L2 signaling to set or change an SpCell (for example, a PCell or PSCell) from the cells included in the activated cell set 320. Additionally or alternatively, when the cell to become the new SpCell is in the deactivated cell set (for example, is included in the cell set 310 configured for L1/L2 mobility but not the activated cell set 320), L1/L2 signaling can be used to move the cell from the deactivated cell set to the activated cell set 320 before further L1/L2 signaling is used to set the cell as the new SpCell. However, in the L1/L2 inter-cell mobility technique shown in FIG. 3, an L3 handover (for example, using RRC signaling) is used to change the SpCell when the new SpCell is not included in the cell set 310 configured for L1/L2 inter-cell mobility. In such cases, RRC signaling associated with the L3 handover may be used to update the cells included in the cell set 310 configured for L1/L2 inter-cell mobility. Accordingly, L1/L2 inter-cell mobility can provide more efficient cell switching to support multi-beam operation, enabling lower latency and reduced overhead by using L1 signaling (for example, DCI) and/or L2 signaling (for example, a MAC-CE) rather than L3 signaling (for example, RRC) to change the beam(s) that a UE uses to communicate over an access link.

Figure 4:
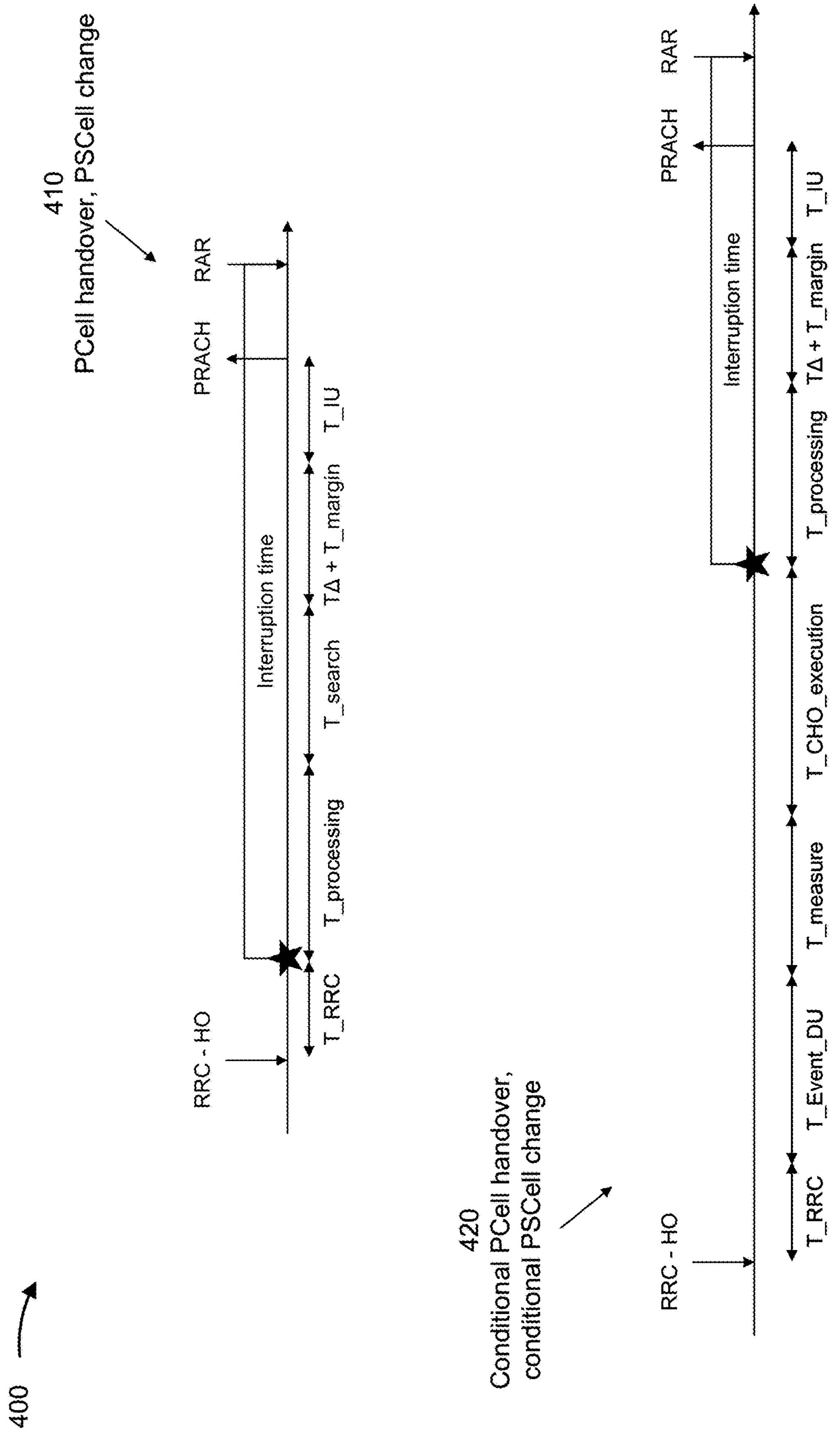
FIG. 4 is a diagram illustrating examples of handover interruption, in accordance with the present disclosure.

FIG. 4 is a diagram illustrating examples of handover interruption 400, in accordance with the present disclosure. For example, as described herein, the examples generally relate to L3 handover scenarios, where RRC signaling is used to trigger a handover from a source cell to a target cell.

For example, as described herein, a wireless network may support LTM to enable fast connected mode mobility that may reduce data interruption relative to L3 triggered mobility by reducing RRC signaling and associated processing delays and/or by reducing downlink synchronization and/or random access channel (RACH) procedure times. For example, in L3 triggered mobility, an RRC configuration for a target cell needs to be transmitted to the UE, and the UE needs to be reconfigured to communicate with the target cell based on the RRC signaling. Accordingly, one potential approach to reducing data interruption due to L3 mobility may be to provide the RRC configuration in advance, and then reduce a downlink synchronization and/or RACH procedure time. For example, in an existing L3 handover procedure, where a UE is indicated to switch to a new (target) cell, the UE may need to first establish downlink synchronization and then establish uplink synchronization on the target cell via a contention-free random access (CFRA) procedure on the target cell before access link communications can be enabled on the target cell. Although the UE can generally start the RACH procedure on the target cell as soon as the UE establishes downlink synchronization on the target cell, a delay in initiating the RACH procedure can be large, due to uncertainty regarding a next available RACH occasion in which the UE can transmit a physical random access channel (PRACH) toward the target cell.

For example, referring to FIG. 4, an example timeline 410 includes various delays for a PCell handover and/or a PSCell change. As shown, the PCell handover and/or PSCell change may be triggered by L3 signaling that carries a handover command (for example, shown as "RRC-HO" in FIG. 4), which is followed by various delays that result in a handover interruption time. For example, as shown in FIG. 4, the L3 handover command is followed by an RRC procedure delay (for example, T_RRC), which is followed by an interruption time that includes a UE processing time (for example, T_processing, which can be up to 20 milliseconds (ms) when the source and target cells are in the same frequency range, or up to 40 ms when the source and target cells are in different frequency ranges) and a search time that the UE requires to search a target cell (for example, T_search, which can be 0 ms when the target cell is known when the handover command is received by the UE, T_rs when the target cell is an unknown intra-frequency cell in FR1, 8×T_rs when the target cell is an unknown intra-frequency cell in FR2, 3×T_rs when the target cell is an unknown inter-frequency cell in FR1, or 8×3×T_rs when the target cell is an unknown inter-frequency cell in FR2, where T_rs is a synchronization signal block (SSB) measurement timing configuration (SMTC) periodicity of the target cell). As further shown, the interruption time may include a synchronization time (for example, TΔ+T_margin, where TΔ=T_rs and where T_margin is a time for SSB post-processing which can be up to 2 ms) associated with fine time tracking and acquiring full timing information for the target cell, and an interruption uncertainty (for example, T_IU) that corresponds to the interruption uncertainty in acquiring a first available PRACH occasion (or RACH occasion) in the target cell and a time associated with receiving a random access response (RAR).

Furthermore, an example timeline 420 shows that a conditional PCell handover and/or a conditional PSCell change may also be subject to various delays that contribute to a handover interruption time. For example, in addition to the RRC procedure delay (for example, T_RRC), the UE processing time (for example, T_processing), the synchronization time (for example, TΔ+T_margin), and the interruption uncertainty (for example, T_IU), a conditional PCell handover or a conditional PSCell change may be subject to a delay uncertainty (for example, T_Event_DU) that represents the time from when the UE successfully decodes a conditional handover command until a condition exists at a measurement reference point that will trigger the conditional handover, a measurement time delay (for example, T_measure) defined from the end of T_Event_DU until the UE executes a handover to a target cell and the interruption time starts, and a conditional handover execution time (T_CHO_execution) that represents a UE conditional execution preparation time.

Accordingly, when a UE receives an RRC message triggering a PCell handover, a PSCell change, a conditional PCell handover, or a conditional PSCell change, the UE may experience an interruption time that starts at a time when the UE starts to execute the handover to the target cell (for example, shown in FIG. 4 using a star icon) and ends at a time when the UE receives an RAR associated with a RACH procedure in the target cell. Because the UE can transmit and receive data in the target cell only after the RACH procedure is complete, techniques based on LTM may be used to reduce the handover interruption time. For example, the RRC procedure delay (for example, T_RRC) and the UE processing time (for example, T_processing) may be reduced by using RRC signaling to preconfigure one or more candidate cells for LTM. Additionally or alternatively, the time for fine time tracking and acquiring full timing information of the target cell (for example, TA) may be reduced by requesting that a UE maintain downlink synchronization for one or more candidate cells configured for LTM prior to an LTM trigger (for example, such that the UE only needs to establish uplink synchronization to enable communication in a target cell after an LTM trigger). However, LTM may require the UE to maintain both downlink synchronization and uplink synchronization for each LTM candidate cell (for example, because the UE does not know which LTM candidate cell will be selected as the target cell for handover). Maintaining both downlink synchronization and uplink synchronization for each LTM candidate cell may be associated with a large processing overhead and/or signaling overhead. In some examples, the UE may be limited (for example, due to a capability of the UE) as to a quantity of cells (or reference signals corresponding to respective cells) for which the UE can maintain downlink synchronization and uplink synchronization.

Figure 5:
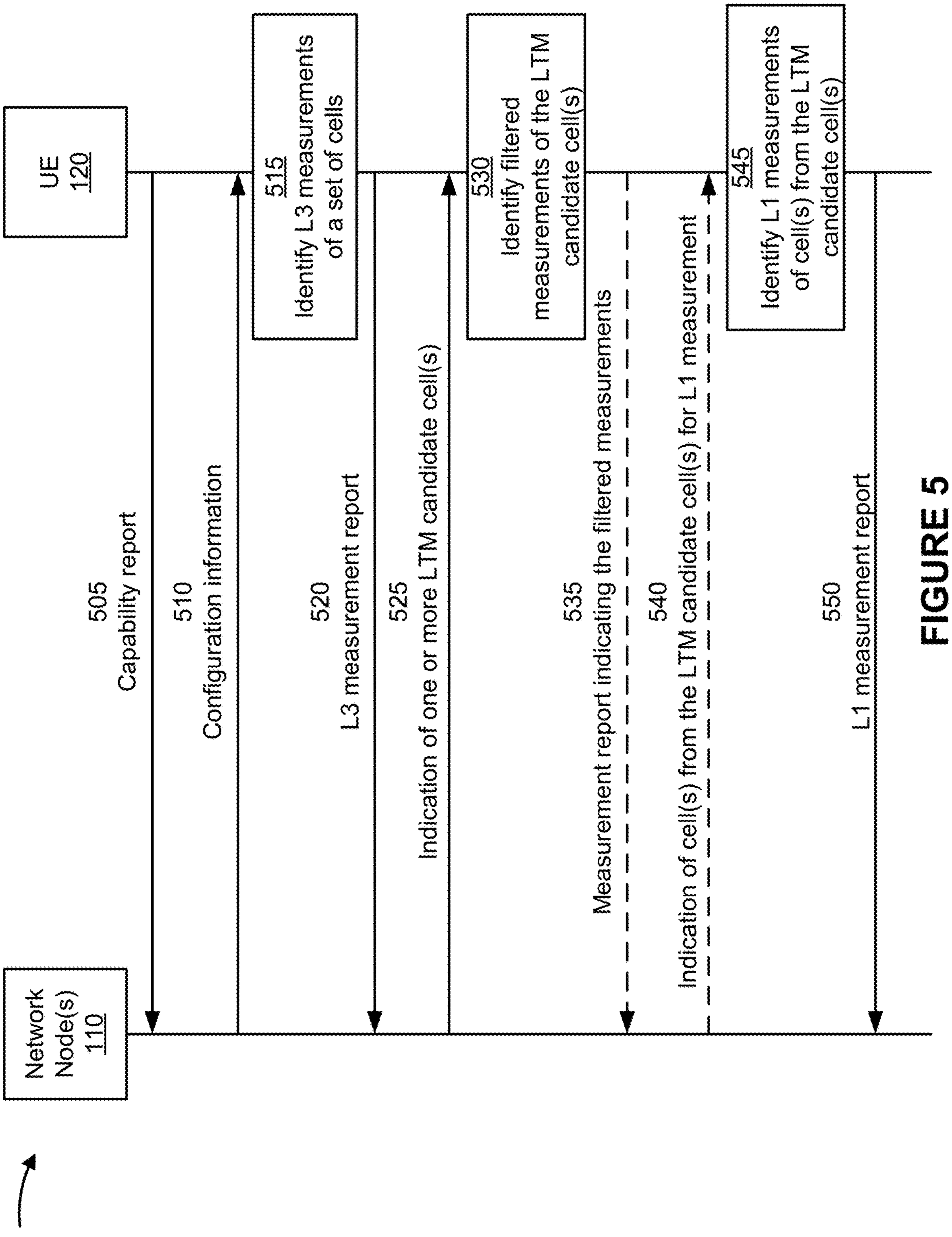
FIG. 5 is a diagram of an example associated with operations associated with hybrid measurements and reporting for Layer 1/Layer 2 triggered mobility (LTM), in accordance with the present disclosure.

FIG. 5 is a diagram of an example associated with operations 500 associated with hybrid measurements and reporting for LTM, in accordance with the present disclosure. As shown in FIG. 5, one or more network nodes 110 (for example, a base station, a CU, a DU, and/or an RU) may communicate with a UE 120. In some aspects, the network node 110 and the UE 120 may be part of a wireless network (for example, the wireless network 100). The UE 120 and the network node 110 may have established a wireless connection prior to operations shown in FIG. 5. In some aspects, the UE 120 may measure one or more cells (for example, associated with the network node 110 and/or other network nodes not shown in FIG. 5), such as one or more neighbor cells.

In a first operation 505, the UE 120 may transmit, and the network node 110 may receive, a capability report. The UE 120 may transmit the capability report via UE capability signaling, a UE assistance information (UAI) communication, an RRC communication, a physical uplink shared channel (PUSCH), and/or a physical uplink control channel (PUCCH), among other examples. The capability report may indicate UE support for one or more operations described herein. For example, the capability report may indicate whether the UE 120 supports L1/L2 mobility operations. For example, the capability report may indicate whether the UE 120 support LTM. In some aspects, the capability report may indicate whether the UE 120 supports hybrid measurement and reporting for LTM, as described in more detail herein. For example, the capability report may indicate whether the UE 120 supports performing filtered measurements (for example, similar to L3 measurements) for LTM candidate cells. Additionally, the capability report may indicate whether the UE 120 supports reporting the filtered measurements (for example, similar to L3 measurements) for LTM candidate cells via a measurement report associated with an L1 format (for example, an L1 report, an L2 report, and/or a MAC report).

In some aspects, the capability report may indicate one or more supported quantities of LTM candidate cells for different types of measurements associated with LTM. For example, the capability report may indicate a first supported quantity of cells and/or measurement resources (for example, SSBs) associated with non-serving cells supported for L1 measurement and/or reporting associated with LTM. Additionally or alternatively, the capability report may indicate a second supported quantity of cells and/or measurement resources (for example, SSB) that can be configured or indicated for filtered measurements. For example, the second supported quantity may indicate a maximum quantity of cells and/or measurement resources that the UE 120 can be configured with for filtered measurements (for example, L3 measurements) before down-selection of the cells and/or measurement resources for LTM-specific L1 based measurements and/or reports, as described in more detail elsewhere herein. The first supported quantity may indicate a maximum quantity of cells and/or measurement resources that the UE 120 can be configured with for the LTM-specific L1 based measurements and/or reports. This enables the network node 110 to configure the UE with more LTM candidate cells than are indicated by the first supported quantity. In other words, the network node 110 may "overbook" the UE 120 with LTM candidate cells beyond the first supported quantity of cells and/or measurement resources. The UE 120 may measure filtered measurements of the configured LTM candidate cells to facilitate the "overbooked" LTM candidate cells to be down-selected for LTM-specific L1 based measurements and/or reports.

The network node 110 may configure the UE 120 in accordance with the capability report. For example, the network node 110 may configure, or may trigger, the UE 120 to perform one or more operations based on, in response to, or otherwise associated with the capability report indicating that the UE 120 supports the one or more operations. For example, the network node 110 may configure the UE 120 to perform hybrid measurements and/or reporting for LTM based on, in response to, or otherwise associated with the capability report indicating that the UE 120 supports the hybrid measurements and/or reporting. As another example, the network node 110 may configure the UE 120 with a quantity of LTM candidate cells in accordance with the second supported quantity indicated by the capability report.

In a second operation 510, the network node 110 may transmit, and the UE 120 may receive, configuration information. In some aspects, the UE 120 may receive the configuration information via one or more of system information signaling, RRC signaling, one or more MAC-CEs, and/or DCI, among other examples. In some aspects, the configuration information may include an indication of one or more configuration parameters for selection by the UE 120, and/or explicit configuration information for the UE 120 to use to configure itself, among other examples.

In some aspects, the configuration information may indicate an L1/L2 mobility configuration. For example, the configuration information may indicate that the UE 120 is configured with LTM-based handovers and/or mobility. For example, the configuration information may indicate a set of cells for L1/L2 inter-cell mobility (for example, in a similar manner as described and depicted in connection with FIG. 3). For example, the configuration information may indicate a set of activated cells and/or a set of deactivated cells for L1/L2 inter-cell mobility.

In some aspects, the configuration information may indicate an L3 measurement and/or report configuration. For example, the L3 measurement and/or report configuration may indicate a set of one or more cells to be measured and reported using L3 filtering. The L3 measurement and/or report configuration may indicate a report configuration and/or one or more measurement objects (for example, in an MeasObjectNR information element (IE)). In some aspects, the L3 measurement and/or report configuration may indicate one or more filter coefficients (for example, in a quantity configuration (a QuantityConfig IE) that defines the measurement filtering configuration used for measurement event evaluation and related reporting) to be applied for L3 filtering. Additionally, the L3 measurement and/or report configuration may indicate a reporting configuration (for example, a ReportConfig IE) that configures criteria for triggering of a measurement reporting event. For example, the reporting configuration may indicate whether the L3 reporting is periodic, aperiodic, and/or event triggered. For example, the reporting configuration may indicate one or more events that trigger the UE 120 to transmit an L3 measurement report.

The UE 120 may configure itself based at least in part on the configuration information. In some aspects, the UE 120 may be configured to perform one or more operations described herein based at least in part on the configuration information.

In a third operation 515, the UE 120 may identify one or more L3 measurement values for a set of one or more cells. In some aspects, the UE 120 may identify the one or more L3 measurement values for a set of one or more cells based on, or otherwise associated with, obtaining the one or more L3 measurement values (for example, from memory of the UE 120). In some aspects, the UE 120 may perform L3 measurements for a set of one or more cells (for example, may measure the set of one or more cells and may apply L3 filtering to obtain the one or more L3 measurement values). As used herein, "measuring a cell" may refer to the UE 120 measuring a signal (for example, an SSB, a channel state information reference signal (CSI-RS), or another reference signal) that is transmitted by a network node that supports or serves the cell. For example, the UE 120 may measure SSBs transmitted via respective cells of the set of one or more cells. In some aspects, the UE 120 may perform the L3 measurements using a wide beam. "Wide beam" may refer to a wireless communication beam that has not been refined and/or that is associated with a small beamforming gain. A wide beam may also be referred to as an unrefined beam. "Narrow beam" may refer to a wireless communication beam that is highly directional and has a high beamforming gain. A narrow beam may also be referred to as a refined beam. While wide beams may generally provide greater coverage, narrow beams may provide higher throughput and lower latency, among other examples.

The set of one or more cells may include neighbor cells and/or candidate cells for handover. Network nodes associated with the set of one or more cells are not shown in FIG. 5 (for example, the network node 110 may support a serving cell associated with the UE 120, and the set of one or more cells may be non-serving cells). The set of one or more cells may be indicated by the L3 measurement and/or report configuration. The UE 120 may perform the L3 measurements by filtering measurements using the one or more filter coefficients indicated by the L3 measurement and/or report configuration.

In a fourth operation 520, the UE 120 may transmit, and the network node 110 may receive, an L3 measurement report indicating L3 measurement values of respective cells from the set of one or more cells. For example, the L3 measurement report may be an RRC report (for example, obtained by an RRC entity or an RRC layer associated with the network node 110). For example, the L3 measurement report may be obtained by a CU (for example, an RU may forward the L3 measurement report to a DU and the DU may forward the L3 measurement report to the CU). The L3 measurement report may indicate one or more L3 measurement values.

The network node 110 (for example, a CU) may select one or more LTM candidate cells. As used herein, "LTM candidate cell" may refer to a cell that is selected (for example, by the network node 110) as a candidate cell for LTM-based handovers. For example, the network node 110 (for example, the CU) may select the one or more LTM candidate cells based on, in response to, or otherwise associated with the L3 measurement report. For example, the network node 110 may select the one or more LTM candidate cells from the set of one or more cells (for example, that are configured for L3 measurement via the L3 measurement and/or report configuration). For example, an LTM candidate cell may be a cell that is down-selected from the set of one or more cells (for example, a set of one or more cells configured for L3 measurement and reporting) for LTM based on, in response to, or otherwise associated with L3 measurement values of the set of one or more cells.

In some aspects, the network node 110 may select the one or more LTM candidate cells to be associated with the hybrid measurement and reporting for LTM described herein. In some aspects, the network node 110 may select N cells to be included in the one or more LTM candidate cells. A value of N may be based on, in accordance with, or otherwise associated with a capability reported by the UE 120 (for example, the second supported quantity reported in the first operation 505). In some aspects, the value of N may be greater than a quantity of cells that can be supported by the UE 120 for LTM-based L1 measurement and reporting (for example, the value of N may be greater than the first supported quantity reported in the first operation 505). This enables a greater quantity of cells to be configured, measured, and/or otherwise tracked for LTM without increasing an overhead associated with maintaining downlink synchronization and uplink synchronization for the cells (for example, because of the hybrid measurement and reporting where the UE 120 performed filtered measurements of the one or more LTM candidate cells, as described in more detail elsewhere herein).

In a fifth operation 525, the network node 110 may transmit, and the UE 120 may receive, an indication of the one or more LTM candidate cells. The indication of the one or more LTM candidate cells may be included in an RRC communication. For example, the network node 110 may transmit, and the UE 120 may receive, an LTM configuration indicating the one or more LTM candidate cells. The one or more LTM candidate cells may be candidates for an LTM-based handover (for example, indicated by an L1 (for example, DCI) or L2 (for example, MAC-CE) based handover command, as described elsewhere herein). In some aspects, the indication of the one or more LTM candidate cells may indicate that the UE 120 is to perform filtered measurements (for example, similar to L3 measurements) of the one or more LTM candidate cells.

In some aspects, the network node 110 may transmit, and the UE 120 may receive, an indication of one or more filter coefficients to be used for filtering of the filtered measurements of the one or more LTM candidate cells. The indication of the one or more filter coefficients may be included in the same RRC communication as the indication of the one or more LTM candidate cells. The one or more filter coefficients associated with the filtered measurements of the one or more LTM candidate cells may be different than the one or more filter coefficients associated with the L3 measurements (for example, performed by the UE 120 in the third operation 515). For example, the filtering of the measurements of the one or more LTM candidate cells may be associated with a first one or more filter coefficients, and the L3 measurements (for example, performed by the UE 120 in the third operation 515) may be associated with a second one or more filter coefficients. In some examples, the one or more LTM candidate cells may be associated with respective filter coefficients (for example, each LTM candidate cell may be associated with its own filter coefficient).

In some aspects, first values for respective filter coefficients from the first one or more filter coefficients (for example, associated with filtering measurements of the LTM candidate cell(s)) may be greater than or equal to second values for respective filter coefficients from the second one or more filter coefficients (for example, associated with the L3 measurements). In other words, a filter coefficient associated with the hybrid measurement of a candidate cell may not be less than a filter coefficient for L3 filtering associated with the candidate cell. The new filter coefficients (for example, for the hybrid measurements) may not be set to smaller values than those for L3 filtering in QuantityConfig (for example, such that the most recent measurement results are reflected to the filtered value of the hybrid measurements no later than the existing L3 measurement for the same measurement resource).

In some aspects, the network node 110 may transmit, and the UE 120 may receive, an indication of a reporting configuration for the hybrid measurements (for example, for the filtered measurement values of the one or more LTM candidate cells). The reporting configuration may indicate that the UE 120 is to report the filtered measurements of the one or more LTM candidate cells via a measurement report having an L1 format (for example, a format similar to an L1 measurement report). For example, the reporting configuration may indicate that a measurement report indicating the filtered measurement values of the one or more LTM candidate cells is to be associated with L1, L2, and/or the MAC layer. In some aspects, the reporting configuration may indicate a reporting periodicity and/or one or more reporting events for the measurement report indicating the filtered measurement values of the one or more LTM candidate cells. For example, the reporting configuration may indicate that the measurement report is to be periodic, aperiodic, and/or event based.

For example, the reporting configuration may indicate one or more events that trigger the UE 120 to transmit a measurement report indicating the filtered measurement values of the one or more LTM candidate cells. The reporting events may be similar to reporting events for L3 measurement reporting. For example, the reporting events may include at least one of the one or more filtered measurement values satisfying a first reporting threshold (for example, an absolute threshold). As another example, the reporting events may include at least one of the one or more filtered measurement values being greater than a measurement value of a serving cell by an amount that satisfies a second reporting threshold (for example, a filtered measurement value (for example, a filtered RSRP value) becoming an amount of offset better than a PCell and/or PSCell's cell-level and/or beam-level measurement value). The thresholds for the reporting events may be configured via the reporting configuration for the hybrid measurements.

In a sixth operation 530, the UE 120 may identify one or more filtered measurement values for respective cells from the one or more LTM candidate cells. In some aspects, the UE 120 may identify the one or more filtered measurement values based on, or otherwise associated with, obtaining the one or more filtered measurement values (for example, from memory of the UE 120). In some aspects, the UE 120 may perform filtered measurements of the one or more LTM candidate cells to obtain the one or more filtered measurement values. As used herein, a "filtered measurement" may refer to a measurement, or measurement value, that is filtered (for example, in the time domain) using one or more filter coefficients. The filtered measurement values may be filtered in the time domain (for example, may be filtered over multiple measurement occasions). The filtered measurements described herein may also be referred to as time-based filtered measurements, LTM L3 measurements, L3 measurements, L3-like measurements, and/or hybrid measurements, among other examples. In some examples, the filtered measurements described herein may be L3 measurements (for example, but may not be reported via L3). The filtered measurement values may be filtered RSRP values, filtered signal-to-noise ratio (SNR) values, filtered RSSI values, and/or filtered RSRQ values, among other examples.

In some aspects, the UE 120 may measure the one or more LTM candidate cells to obtain one or more filtered measurement values associated with respective cells from the one or more LTM candidate cells. For example, the UE 120 may measure measurement resources (for example, SSBs or other reference signals) associated with respective cells from the one or more LTM candidate cells. In some aspects, the UE 120 may perform the filtered measurements without fine tuning the measurement resources in terms of time and/or frequency synchronization. For example, the UE 120 may perform the filtered measurements using a wide beam (for example, without performing receive beamforming or beam training). The UE 120 may perform beam-level measurements (for example, measurements per resource) before consolidating the measurements over multiple resources into one representative measurement sample (for example, before filtering). For example, the UE 120 may measure a measurement resource (for example, an SSB) associated with a given LTM candidate cell. The UE may apply a filter coefficient to combine the measurement value of the measurement resource with a previous measurement value (for example, a previous filtered measurement) associated with a previous measurement occasion or time domain occasion. For example, the filtered measurement may be represented as $M_{1,filtered}=(W\times M_{1,beam})+((1-W)\times M_{0,filtered})$, where $M_{1,filtered}$ is the filtered measurement value, W is the filter coefficient associated with the measurement resource and/or the given LTM candidate cell, $M_{1,beam}$ is the beam-level measurement of the measurement resource (for example, a measurement of an SSB at a given time), and $M_{0,filtered}$ is the previous measurement value for the measurement resource and/or the given LTM candidate cell. After a next measurement occasion for the measurement resource and/or the given LTM candidate cell, the filtered measurement value may be represented as $M_{2,filtered}=(W\times M_{2,beam})+((1-W)\times M_{1,filtered})$.

In some aspects, in a seventh operation 535, the UE 120 may transmit, and the network node 110 may receive, a measurement report indicating the one or more filtered measurement values. The measurement report may have a Layer 1 format (for example, may have a format similar to a Layer 1 measurement report). In some aspects, the UE 120 may transmit the measurement report periodically, aperiodically, and/or in response to detecting a reporting event (for example, a reporting event described above). In some aspects, the measurement report may be a Layer 2 report. For example, the measurement report may be a MAC layer report. In some aspects, a Layer 2 or a MAC layer of the network node 110 (for example, a MAC layer of a DU) may obtain the measurement report indicating the one or more filtered measurement values. In other words, by the UE 120 transmitting the one or more filtered measurement values of the one or more LTM candidate cells via a measurement report that is obtainable by the MAC layer of a DU, a latency or delay associated with the MAC layer of the DU performing an operation in response to the one or more filtered measurement values may be reduced. For example, typically, filtered measurement values (for example, time filtered measurement values) are reported to a Layer 3 or RRC layer (for example, which may be hosted by a CU). Reporting the filtered measurement values of the LTM candidate cells would introduce a delay associated with the Layer 3 or the RRC layer obtaining the filtered measurement value(s) and providing an indication to the MAC layer and/or the DU of an operation to be performed for LTM (for example, because the DU may host the L1 and/or L2 that are associated with triggered LTM-based handovers). This delay may be eliminated by reporting the filtered measurement value(s) of the LTM candidate cells via a measurement report that is obtainable and/or decodable by a MAC layer and/or by a DU (for example, to enable the MAC layer and/or the DU to quickly perform an operation in response to the reported filtered measurement value(s) of the LTM candidate cells).

For example, the network node 110 (for example, the DU or a MAC entity of the network node 110) may select one or more cells for L1 measurement and reporting based on, in response to, or otherwise associated with the indication of the one or more filtered measurement values. For example, the network node 110 may down-select one or more cells from the one or more LTM candidate cells based on, in response to, or otherwise associated with the indication of the one or more filtered measurement values. For example, a MAC layer or a MAC entity associated with the network node 110 may select the one or more cells for L1 measurement and reporting from the one or more LTM candidate cells. The selected cells for L1 measurement and reporting may be the cells, from the one or more LTM candidate cells, with the highest filtered measurement values as reported by the UE 120. In some aspects, the network node 110 may select K cells, from the one or more LTM candidate cells, to be associated with L1 measurement and reporting. A value of K may be based on, in accordance with, or otherwise associated with a capability reported by the UE 120 (for example, the first supported quantity reported in the first operation 505).

In some aspects, in an eighth operation 540, the network node 110 may transmit, and the UE 120 may receive, an indication of the one or more cells for L1 measurement and reporting. As used herein, "LTM-based L1 measurement and reporting" may refer to L1 measurements and/or L1 measurement reports that are associated with facilitating LTM. For example, the network node 110 (for example, a DU) may transmit an L1 measurement and reporting configuration for LTM indicating that the one or more cells are to be measured using L1 measurement techniques. In some aspects, the indication of the one or more cells for L1 measurement and reporting may be communicated via L1 signaling (for example, DCI) and/or L2 signaling (for example, MAC-CE).

In some other aspects, such as when the UE 120 does not transmit the measurement report of the filtered measurement value(s) (for example, does not perform the seventh operation 535), the UE 120 may select the one or more cells for L1 measurement and reporting based on, in response to, or otherwise associated with the one or more filtered measurement values. For example, the UE 120 may down-select one or more cells from the one or more LTM candidate cells based on, in response to, or otherwise associated with the one or more filtered measurement values. The selected cells for L1 measurement and reporting may be the cells with the highest filtered measurement values, as measured by the UE 120. In some aspects, the UE 120 may select K cells, from the one or more LTM candidate cells, to be associated with L1 measurement and reporting. A value of K may be based on, in accordance with, or otherwise associated with a capability reported by the UE 120 (for example, the first supported quantity reported in the first operation 505).

In some aspects, the UE may detect a trigger event that causes the UE 120 to select the one or more cells for LTM L1 measurement and reporting. The trigger may be similar to a reporting event described above. For example, the trigger event may include at least one of the one or more filtered measurement values satisfying a first threshold (for example, an absolute threshold). As another example, the trigger event may include at least one of the one or more filtered measurement values being greater than a measurement value of a serving cell by an amount that satisfies a second threshold (for example, a filtered measurement value (for example, a filtered RSRP value) becoming an amount of offset better than a PCell and/or PSCell's cell-level and/or beam-level measurement value). As another example, the trigger event may include a relative measurement value of a given cell satisfying a third threshold. The relative measurement value may be a difference between a filtered measurement of the given cell and a filtered measurement of a serving cell of the UE 120. The UE 120 may receive an indication of the first threshold, the second threshold, and/or the third threshold (for example, in the second operation 510, the fifth operation 525, or the eighth operation 540). In some aspects, the UE 120 may receive an indication of one or more trigger events (for example, in the second operation 510, the fifth operation 525, or the eighth operation 540) for down-selecting cells (for example, from LTM candidate cells) to be associated with LTM L1 measurement and reporting. Additionally or alternatively, a wireless communication standard, such as the 3GPP, may define, or otherwise fix, one or more trigger events.

In some aspects, more than K cells may satisfy or meet the trigger event(s). In such examples, the UE 120 may select the K cells (for example, from the more than K cells) that have the highest or best filtered measurement values. As another example, the UE 120 may select the K cells (for example, from the more than K cells) that have satisfied or met the trigger event(s) for a longest period of time.

In a ninth operation 545, the UE 120 may identify one or more L1 measurement values of the one or more cells (for example, that have been down-selected by the UE 120 or the network node 110). In some aspects, the UE 120 may identify the one or more L1 measurement values based on, in response to, or otherwise associated with obtaining an indication of the one or more L1 measurement values (for example, from memory of the UE 120). In some aspects, the UE 120 may perform L1 measurements of the one or more cells. For example, the UE 120 may measure measurement resources (for example, SSBs) of respective cells from the one or more cells. In some aspects, the UE 120 may perform the L1 measurements using a narrow beam or a refined beam. The L1 measurements may indicate instantaneous radio conditions (for example, may not be filtered over time like the filtered measurements performed in the sixth operation 530).

In a tenth operation 550, the UE 120 may transmit, and the network node 110 may receive, an L1 measurement report indicating the L1 measurement values of the one or more cells. For example, a MAC layer and/or a DU may obtain the L1 measurement report. The network node 110 (for example, the DU) may identify a target cell for handover based on, in response to, or otherwise associated with the L1 measurement report. The network node 110 may transmit, and the UE 120 may receive, an LTM handover command (for example, an L1 or L2 command) indicating the target cell and indicating that the UE 120 is to be handed over to the target cell.

As a result, the UE 120 may perform the hybrid measurement and reporting that includes performing filtered measurements (for example, similar to L3 measurements) of LTM candidate cells and L1 measurement reporting to enable a larger quantity of cells to be monitored, measured, and/or tracked, while also enabling a Layer 2 (for example, a MAC layer) of the network node 110 to quickly perform LTM operations associated with the LTM candidate cells. For example, the larger quantity of cells may be monitored, measured, and/or tracked because the UE 120 does not perform L1 measurements of all of the configured LTM candidate cells and instead performs filtered measurements (for example, thereby lessening an overhead or burden associated with fine tuning time domain and/or frequency domain synchronization and beamforming). Further, using filtered measurements and/or reporting the filtered measurements to the Layer 2 (for example, a MAC layer) of the network node 110 facilitate LTM operations to be performed quickly.

Figure 6:
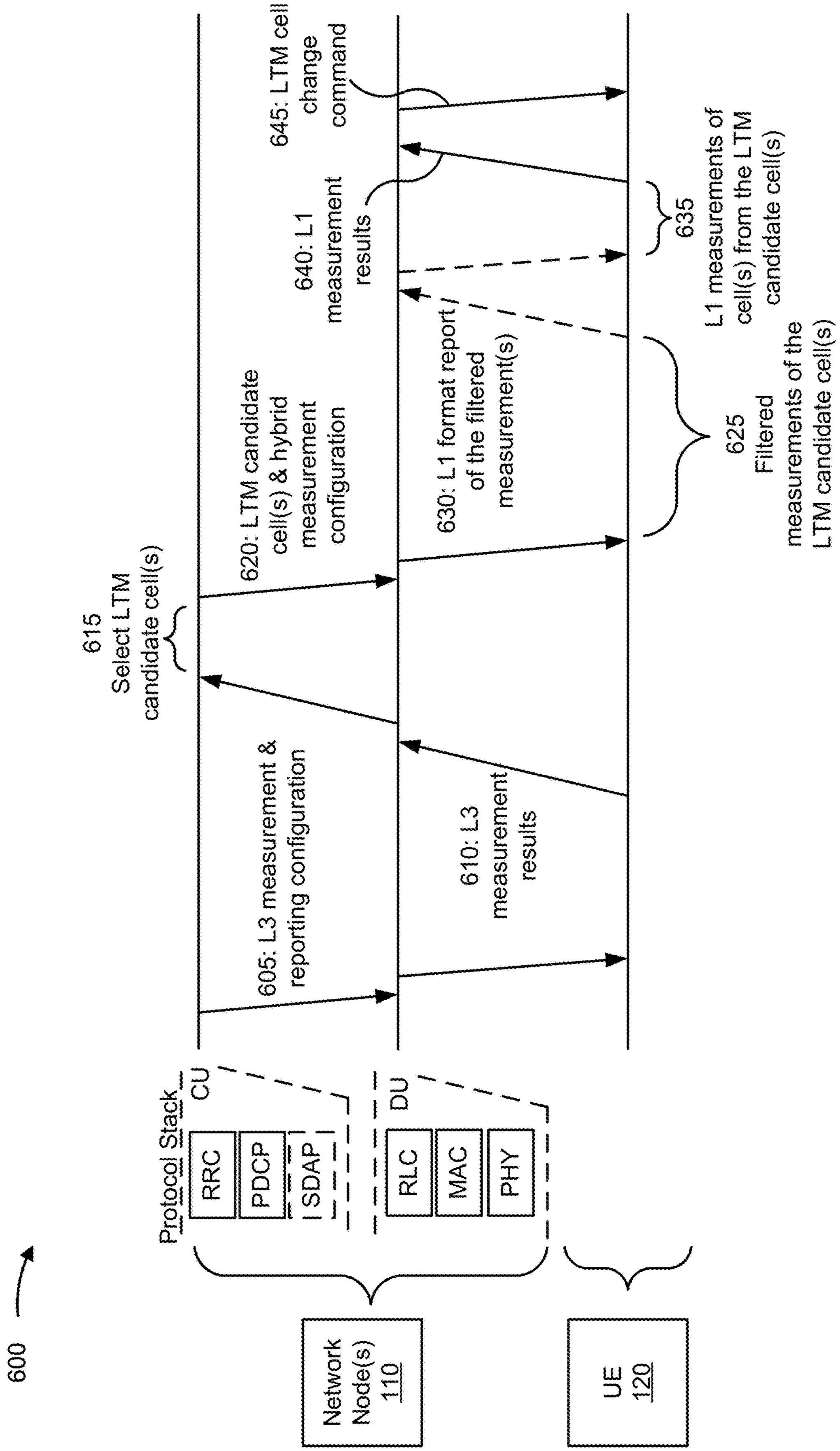
FIG. 6 is a diagram of an example associated with operations at different protocol stack layers associated with hybrid measurements and reporting for LTM, in accordance with the present disclosure.

FIG. 6 is a diagram of an example associated with operations 600 at different protocol stack layers associated with hybrid measurements and reporting for LTM, in accordance with the present disclosure. As shown in FIG. 6, different network protocol stack layers or entities may be hosted by different devices or entities. For example, a CU may host one or more higher layer control functions, such as RRC functions (for example, an RRC layer or an RRC entity), PDCP functions (for example, a PDCP layer or a PDCP entity), and/or SDAP functions (for example, an SDAP layer or an SDAP entity), among other examples. A DU may host an RLC layer, a MAC layer, and/or one or more PHY layers. The split of functions or layers may be as depicted in FIG. 6. In other examples, the functional split may be different and/or may be defined, or otherwise fixed, by a wireless communication standard, such as the 3GPP. In some aspects, the CU and the DU may be separate devices or separate entities. In some other aspects, the CU and the DU may be logical entities associated with the same device.

In a first operation 605, the CU may transmit an L3 measurement and reporting configuration. For example, the L3 measurement and reporting configuration may be an RRC communication. The L3 measurement and reporting configuration may be similar to the L3 measurement and reporting configuration described in connection with FIG. 5. The CU may transmit the L3 measurement and reporting configuration to the DU. The DU may transmit (for example, forward) the L3 measurement and reporting configuration to the UE 120 (for example, via an RU). The UE 120 may identify and/or perform L3 measurements in accordance with the L3 measurement and reporting configuration. For example, the UE 120 may identify L3 measurement values associated with a set of one or more cells (for example, that are configured via the L3 measurement and reporting configuration).

In a second operation 610, the UE 120 may transmit an L3 measurement report indicating the L3 measurement values associated with the set of one or more cells. In some aspects, the L3 measurement report may be an RRC report. The UE 120 may transmit the L3 measurement report in a similar manner as described in connection with the fourth operation 520. The UE 120 may transmit the L3 measurement report to an RU (not shown in FIG. 6). The RU may output, and the DU may obtain, the L3 measurement report. The DU may output, and the CU may obtain, the L3 measurement report. For example, because the L3 measurement report is associated with a layer or function (for example, RRC) hosted by the CU, the DU may be unable to decode and/or obtain information included in the L3 measurement report.

In a third operation 615, the CU may select (for example, down-select) one or more LTM candidate cells from the set of one or more cells. For example, there may be a processing delay associated with the CU selecting the one or more LTM candidate cells based on, in response to, or otherwise associated with the L3 measurement report. The CU may select cells (for example, the one or more LTM candidate cells) for the hybrid measurement and reporting for LTM described herein. For example, the CU may select cells that are to be measured using wide beams and/or filtered measurements for LTM, but that are to be reported via a lower layer, such as L2 or L1. The CU may select the one or more LTM candidate cells based on, in response to, or otherwise associated with the reported L3 measurement values. For example, the one or more LTM candidate cells may be cells associated with the highest L3 measurement values as indicated by the L3 measurement report.

In a fourth operation 620, the CU may transmit an indication of the one or more LTM candidate cells and a hybrid measurement configuration. For example, the indication of the one or more LTM candidate cells and the hybrid measurement configuration may be included in one or more RRC communications. The hybrid measurement configuration may indicate filter coefficients for respective cells and/or respective measurement resources (for example, SSBs) to be measured by the UE 120. For example, the filter coefficients may be specific to the LTM hybrid measurements (for example, may be different than filter coefficient(s) indicated by the L3 measurement and reporting configuration). In some aspects, the hybrid measurement configuration may indicate reporting criteria and/or reporting events associated with the UE 120 reporting filtered measurements of the one or more LTM candidate cells. In some aspects, the hybrid measurement configuration may indicate criteria for selecting cells from the one or more LTM candidate cells to be associated with LTM-based L1 measurements and/or reporting, as described in more detail elsewhere herein. The CU may transmit the indication of the one or more LTM candidate cells and the hybrid measurement configuration to the DU. The DU may transmit (for example, forward), and the UE 120 may receive, the indication of the one or more LTM candidate cells and the hybrid measurement configuration (for example, via an RU).

In a fifth operation 625, the UE 120 may identify one or more filtered measurements of respective cells from the one or more LTM candidate cells. For example, the UE 120 may calculate or determine a filtered measurement for a given LTM candidate cell using multiple measurements of the given LTM candidate cell over time (for example, combining the multiple measurements using one or more filter coefficients (for example, weights) associated with the given LTM candidate cell). In some aspects, the UE 120 may select (for example, autonomously, without receiving an indication from a network node) one or more cells, from the one or more LTM candidate cells, for LTM-based L1 measurement and/or reporting. For example, the UE 120 may down-select the one or more cells, from the one or more LTM candidate cells, based on, in response to, or otherwise associated with the one or more filtered measurements. For example, the UE 120 may use the one or more filtered measurements to identify cells, from the one or more LTM candidate cells, that are best suited for LTM-based L1 measurement and/or reporting (for example, that are associated with a highest filtered measurement value or a filtered measurement value that satisfies or meets one or more selection criteria). The selection criteria may be similar to the reporting event(s) and/or trigger event(s) described above in connection with FIG. 5.

In some aspects, in a sixth operation 630, the UE 120 may (optionally) transmit an L1 format report of the one or more filtered measurements. For example, the UE 120 may transmit a measurement report having a format similar to an L1 measurement report. For example, the measurement report indicating the one or more filtered measurements (for example, that are associated with a wide beam at the UE 120 and/or are similar to L3 measurements) may be a Layer 2 report or a Layer 1 report. In some aspects, the measurement report may be a MAC layer report. Transmitting the measurement report using a format similar to an L1 measurement report may enable the DU to obtain and extract information from the measurement report. For example, the measurement report may be decodable by a protocol stack layer or entity hosted by the DU. As an example, a MAC layer or MAC entity hosted by the DU may decode and obtain information indicative of the one or more filtered measurements. This may reduce latency that would have otherwise been introduced in association with reporting the L3-like measurements (for example, the filtered measurements) via a measurement report associated with a higher layer (for example, RRC), because the higher layer measurement report would need to be provided to the CU (for example, that hosts the higher layer), decoded by the CU, and then provided back to the DU.

In some aspects, the DU may select the one or more cells, from the one or more LTM candidate cells, for LTM-based L1 measurement and/or reporting. For example, the DU may down-select the one or more cells, from the one or more LTM candidate cells, based on, in response to, or otherwise associated with the one or more filtered measurements. The DU may select the one or more cells in a similar manner as described in connection with the UE 120 selecting the one or more cells. In some aspects, the DU may transmit, and the UE 120 may receive, an indication of the one or more cells (for example, that are selected by the DU). For example, the indication of the one or more cells may be included in an L1 communication (for example, DCI) or an L2 communication (for example, MAC-CE).

In a seventh operation 635, the UE 120 may identify one or more L1 measurement values of respective cells from the one or more cells (for example, that are down-selected from the one or more LTM candidate cells). For example, the UE 120 may perform time domain synchronization and/or frequency domain synchronization associated with respective cells from the one or more cells, and/or perform beam training or beamforming to enable the UE 120 to perform the L1 measurements of the one or more cells.

In an eighth operation 640, the UE 120 may transmit an L1 measurement report, associated with LTM, indicating the one or more L1 measurement values. For example, the L1 measurement report may be decodable by a layer or function hosted by the DU. The DU may obtain information indicated by the L1 measurement report (for example, may obtain an indication of the one or more L1 measurement values). The DU may select a target cell for handover from the one or more cells based on, in response to, or otherwise associated with, the one or more L1 measurement values. For example, the DU may identify that a cell satisfies criteria for selection as a target cell based on, in response to, or otherwise associated with, the one or more L1 measurement values. In a ninth operation 645, the DU may transmit, and the UE 120 may receive, an LTM cell change command indicating the target cell. For example, the DU may transmit an L1 or an L2 command (for example, communication) indicating that the UE 120 is to switch serving cells to the target cell. The UE 120 may then perform one or more operations to switch the serving cell of the UE 120 to the target cell.

Figure 7:
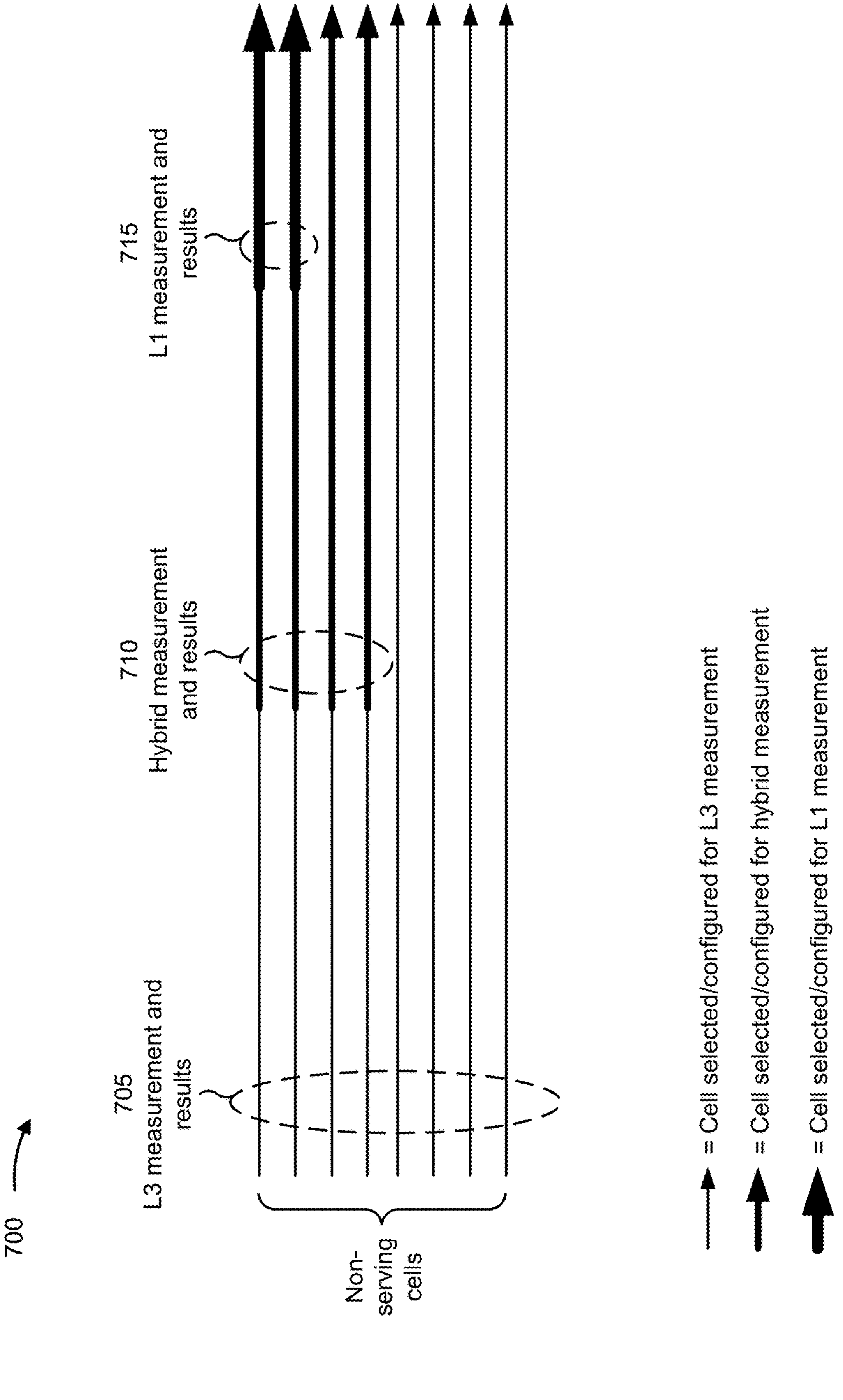
FIG. 7 is a diagram of an example associated with down-selection stages associated with hybrid measurements and reporting for LTM, in accordance with the present disclosure.

FIG. 7 is a diagram of an example associated with down-selection stages 700 associated with hybrid measurements and reporting for LTM, in accordance with the present disclosure. As shown in FIG. 7, the UE 120 may be configured with a set of non-serving cells for measurement (for example, via a measurement object configuration or another RRC configuration). For example, each arrow in FIG. 7 may be indicative of a given non-serving cell. For example, the UE 120 may be configured to perform L3 measurements of the set of non-serving cells. For example, in a first operation 705, the UE 120 may perform and/or transmit an indication of L3 measurement results for respective cells included in the set of non-serving cells.

As shown in FIG. 7, a first subset of non-serving cells (for example, shown by the four uppermost arrows in FIG. 7) may be selected from the set of non-serving cells for hybrid measurement and reporting associated with LTM. The hybrid measurement may be an intermediate measurement for LTM (for example, between L3 measurements and L1 measurements). The first subset of non-serving cells may be down-selected from the set of non-serving cells (for example, based on, in response to, or otherwise associated with the L3 measurement results). For example, the first subset of non-serving cells may be associated with L3 measurement results that satisfy one or more selection criteria (for example, that are associated with highest L3 measurement results or L3 measurement results that satisfy one or more thresholds). For example, in a second operation 710, the UE 120 may perform filtered measurements of the first subset of non-serving cells. For example, the UE 120 may perform filtered measurements of the set of non-serving cells using a first one or more filter coefficients (or weights) and may perform filtered measurements of the first subset of non-serving cells using a second (for example, different) one or more filter coefficients (or weights). As described elsewhere herein, the first subset of non-serving cells may be associated with measurements similar to L3 measurements, and reporting similar to L1 measurements (for example, may be filtered measurements reported using L1 or L2 signaling). This enables the UE 120 to measure and/or track the first subset of non-serving cells for LTM without being required to perform time domain synchronization, frequency domain synchronization, and/or beamforming associated with the first subset of non-serving cells, because the UE 120 can perform filtered measurements using a wide beam (for example, an unrefined beam).

A second subset of non-serving cells (for example, shown by the two uppermost arrows in FIG. 7) may be selected from the first subset of non-serving cells for L1 measurement and reporting associated with LTM. For example, the second subset of non-serving cells may be down-selected from the first subset of non-serving cells (for example, based on, in response to, or otherwise associated with the filtered measurement results of the first subset of non-serving cells). For example, the second subset of non-serving cells may be associated with filtered measurement results that satisfy one or more selection criteria (for example, that are associated with highest filtered measurement results or filtered measurement results that satisfy one or more thresholds). For example, in a third operation 715, the UE 120 may perform L1 measurements of respective cells included in the second subset of non-serving cells. The UE 120 may perform time domain synchronization, frequency domain synchronization, and/or beamforming associated with respective cells included in the second subset of non-serving cells to enable the UE 120 to perform the L1 measurements. For example, the UE 120 may perform the L1 measurements using one or more narrow beams or one or more refined beams. In some aspects, the L1 measurements may be performed without time domain filtering. In some aspects, a measurement cycle for the L1 measurements may be shorter than a measurement cycle associated with the hybrid measurements. For example, the measurement cycle for the L1 measurements may be X times the periodicity of a measurement resource being measured, where a value of X may be a quantity of cells included in the second subset of non-serving cells and/or a quantity of resources for L1 measurements included the serving cell(s). A value of X may be different for different frequency ranges.

As a result, the UE 120 may track, measure, and/or maintain information associated with a larger quantity of non-serving cells for LTM. For example, the UE 120 may be capable of measuring and/or maintaining information associated with more beams for the hybrid measurements (for example, because time domain synchronization, frequency domain synchronization, and/or beamforming may not be needed for the hybrid measurements). As a result, the UE 120 may measure more cells (for example, four cells rather than two cells, as shown in FIG. 7) for LTM. By reporting information associated with the hybrid measurements using an L1 or L2 format, additional latency is avoided in the LTM procedure that may have otherwise been associated with using filtered measurements.

Figure 8:
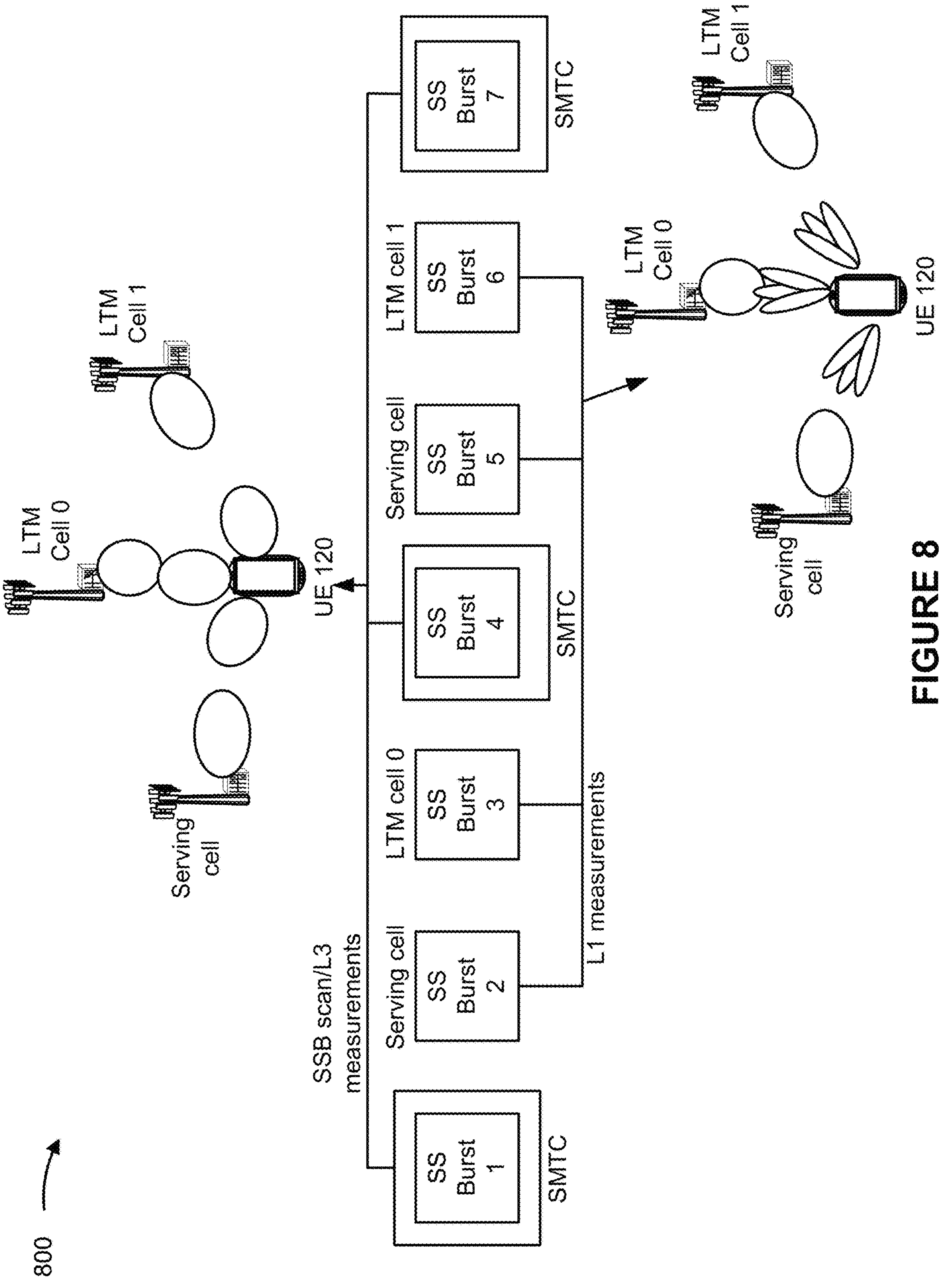
FIG. 8 is a diagram of an example associated with measurement resources associated with hybrid measurements and reporting for LTM, in accordance with the present disclosure.

FIG. 8 is a diagram of an example associated with measurement resources 800 associated with hybrid measurements and reporting for LTM, in accordance with the present disclosure. The measurement resources may be SSBs or another downlink reference signal. For example, a synchronization signal (SS) hierarchy may include an SS burst set, which may include multiple SS bursts, shown as SS burst 0 through SS burst 7.

Each SS burst may include one or more SSBs. In some aspects, different SSBs may be beam-formed differently (for example, transmitted using different beams), and may be used for cell search, cell acquisition, beam management, and/or beam selection (for example, as part of an initial network access procedure). An SS burst set may be periodically transmitted by a wireless node (for example, a network node 110), such as every X milliseconds. In some aspects, an SS burst set may have a fixed or dynamic length. In some examples, an SS burst set or an SS burst may be associated with a discovery reference signal (DRS) transmission window or an SMTC window. In some aspects, an SSB may include an SSB index, which may correspond to a beam used to carry the SSB. The UE 120 may monitor for and/or measure SSBs using different Rx beams. Based at least in part on the monitoring and/or measuring, the UE may indicate one or more SSBs with a best signal parameter (for example, an RSRP parameter) to a network node 110 (for example, directly or via one or more other network nodes).

As shown in FIG. 8, the UE 120 may use SSBs or SS bursts associated with an SMTC for SSB scans and/or filtered measurements (for example, the hybrid measurements and/or L3 measurements described herein). For example, the UE 120 may measure the one or more LTM candidate cells during an SMTC window. The UE 120 may perform Rx beam sweeping using wide beams and/or unrefined beams to measure SSBs associated with respective cells (including a serving cell and one or more LTM candidate cells). For example, the filtered measurement values (for example, the hybrid measurements, such as the measurement values identified during the sixth operation 530) may be obtained via measuring SSBs associated with the SS burst 1, the SS burst 4, and/or the SS burst 7. By using the wide beams and/or unrefined beams to measure SSBs associated with respective cells, the UE 120 may skip time domain synchronization, frequency domain synchronization, beamforming, or beam refinement because the wide beams may enable the UE 120 to obtain measurements that are sufficient for the filtered measurement values.

The UE 120 may use other SS bursts for beam refinements and/or L1 measurements. For example, the UE 120 may measure SSBs associated with the SS burst 2, the SS burst 3, the SS burst 5, and the SS burst 6 for beam refinements and/or L1 measurements. As an example, the UE 120 may identify L1 measurement values (for example, the L1 measurement values identified in the ninth operation 545) using SSBs associated with the SS burst 2, the SS burst 3, the SS burst 5, and/or the SS burst 6. For example, the UE 120 may use one or more narrow beams or refined beams to measure SSBs during the SS burst 2, the SS burst 3, the SS burst 5, and/or the SS burst 6.

In some aspects, the SS bursts for beam refinement and/or L1 measurement may be associated with a sharing factor associated with LTM candidate cells and a serving cell of the UE 120. For example, the sharing factor ($P_{LTM}$) may indicate an allocation of SS burst occasions between the serving cell and the one or more LTM candidate cells (that are selected for L1 measurement). For example, the $P_{LTM}$ may indicate a rate or frequency at which SS bursts are to be associated with the serving cell(s). As an example, the $P_{LTM}$ may indicate that every L SS bursts (outside of the SMTC windows) are to be associated with the serving cell(s). This enables the UE 120 to maintain current measurements of the serving cell(s) while also identifying measurement values associated with LTM candidate cells. As an example, shown in FIG. 8, a value of L may be two, such that every other SS burst (outside of the SMTC windows) is associated with the serving cell(s) of the UE 120. The remaining SS bursts may be allocated to LTM candidate cells that are configured, indicated, or selected for L1 measurements (for example, the second subset of non-serving cells described in connection with FIG. 7). For example, the SS burst 2 may be associated with measuring SSBs associated with the serving cell of the UE 120, the SS burst 3 may be associated with measuring SSBs associated with an LTM candidate cell 0, the SS burst 5 may be associated with measuring SSBs associated with the serving cell, and the SS burst 6 may be associated with measuring SSBs associated with an LTM candidate cell 1. A value of $P_{LTM}$ may be, or may be based on or otherwise associated with, a capability of the UE 120.

In some aspects, an LTM L1 measurement delay may be defined to enable the UE 120 to refine Rx beams for every $P_{LTM}$ SS bust outside of the SMTC window of a carrier. For example, other SS bursts outside of the SMTC window may be used for Rx beam refinement of the LTM candidate cells, and the SS bursts (for example, that are not allocated for the serving cell(s)) may be equally shared by the LTM candidate cells selected or indicated for L1 measurements.

Figure 9:
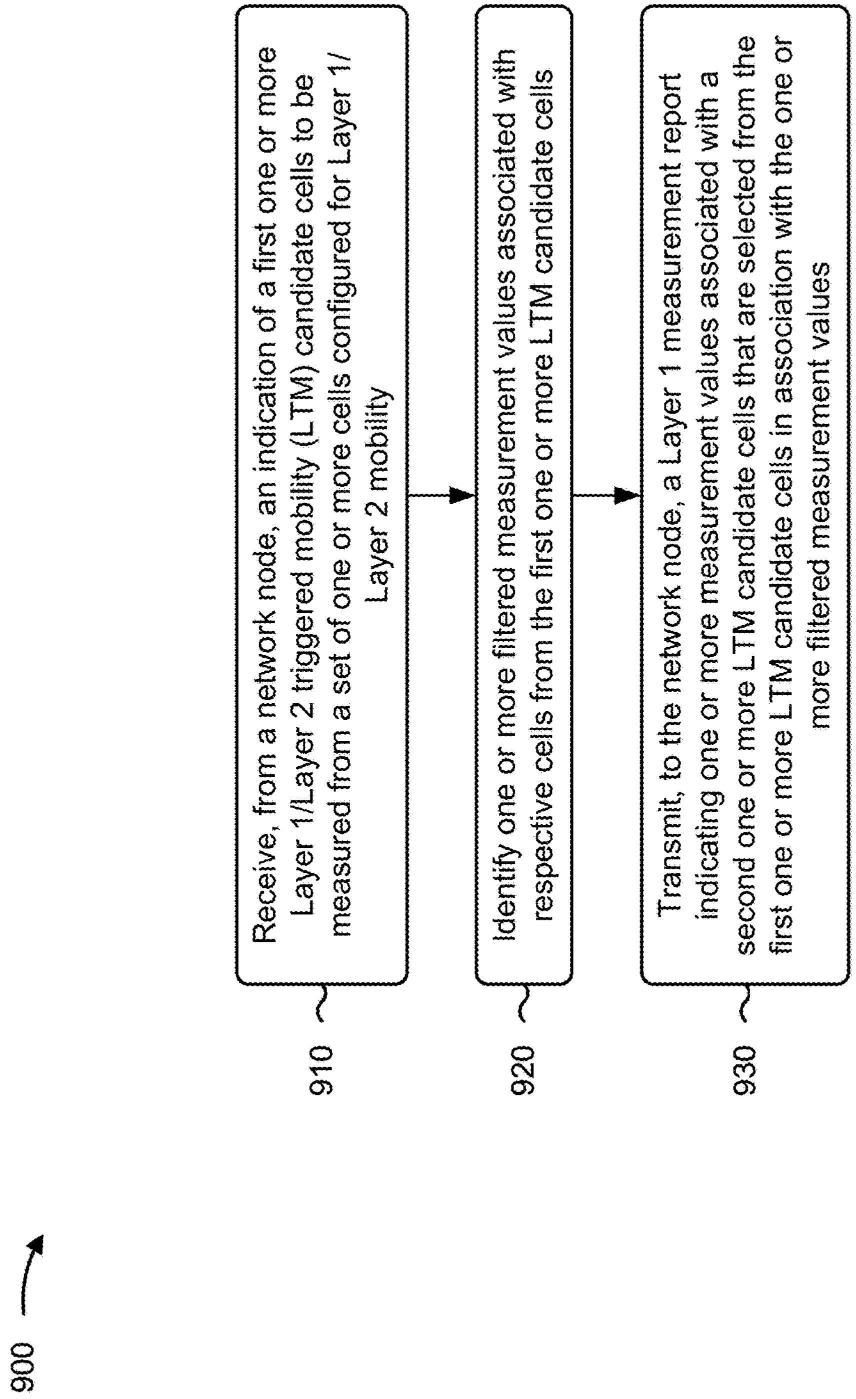
FIG. 9 is a diagram illustrating an example process performed, for example, by a UE, associated with hybrid measurements and reporting for LTM, in accordance with the present disclosure.

FIG. 9 is a diagram illustrating an example process 900 performed, for example, by a UE, associated with hybrid measurements and reporting for LTM, in accordance with the present disclosure. Example process 900 is an example where the UE (for example, the UE 120) performs operations associated with hybrid measurements and reporting for LTM.

As shown in FIG. 9, in some aspects, process 900 may include receiving, from a network node, an indication of a first one or more LTM candidate cells to be measured from a set of one or more cells configured for Layer 1/Layer 2 mobility (block 910). For example, the UE (such as using reception component 1102 and/or communication manager 1106, depicted in FIG. 11) may receive, from a network node, an indication of a first one or more LTM candidate cells to be measured from a set of one or more cells configured for Layer 1/Layer 2 mobility, as described above.

As further shown in FIG. 9, in some aspects, process 900 may include identifying one or more filtered measurement values associated with respective cells from the first one or more LTM candidate cells (block 920). For example, the UE (such as using communication manager 1106, depicted in FIG. 11) may identify one or more filtered measurement values associated with respective cells from the first one or more LTM candidate cells, as described above.

As further shown in FIG. 9, in some aspects, process 900 may include transmitting, to the network node, a Layer 1 measurement report indicating one or more measurement values associated with a second one or more LTM candidate cells that are selected from the first one or more LTM candidate cells in association with the one or more filtered measurement values (block 930). For example, the UE (such as using transmission component 1104 and/or communication manager 1106, depicted in FIG. 11) may transmit, to the network node, a Layer 1 measurement report indicating one or more measurement values associated with a second one or more LTM candidate cells that are selected from the first one or more LTM candidate cells in association with the one or more filtered measurement values, as described above.

Process 900 may include additional aspects, such as any single aspect or any combination of aspects described below and/or in connection with one or more other processes described elsewhere herein.

In a first aspect, process 900 includes transmitting, to the network node, a capability report indicating at least one of a first supported quantity of cells or measurement resources associated with non-serving cells included in the second one or more LTM candidate cells, or a second supported quantity of cells or measurement resources associated with the first one or more LTM candidate cells.

In a second aspect, alone or in combination with the first aspect, receiving the indication of the first one or more LTM candidate cells includes receiving an indication of one or more filter coefficients to be associated with the one or more filtered measurement values.

In a third aspect, alone or in combination with one or more of the first and second aspects, the one or more filter coefficients are a first one or more filter coefficients, and process 900 includes receiving a measurement report configuration indicating a second one or more filter coefficients to be associated with Layer 3 measurements.

In a fourth aspect, alone or in combination with one or more of the first through third aspects, first values for respective filter coefficients from the first one or more filter coefficients are greater than or equal to second values for respective filter coefficients from the second one or more filter coefficients.

In a fifth aspect, alone or in combination with one or more of the first through fourth aspects, process 900 includes transmitting a measurement report indicating the one or more filtered measurement values, the measurement report having a Layer 1 format.

In a sixth aspect, alone or in combination with one or more of the first through fifth aspects, the measurement report is a Layer 2 report.

In a seventh aspect, alone or in combination with one or more of the first through sixth aspects, the measurement report is a MAC layer report.

In an eighth aspect, alone or in combination with one or more of the first through seventh aspects, transmitting the measurement report is in response to detecting an event.

In a ninth aspect, alone or in combination with one or more of the first through eighth aspects, the event is associated with at least one of the one or more filtered measurement values, where the at least of the one or more filtered measurement values satisfies a first reporting threshold, or is greater than a measurement value of a serving cell by an amount that satisfies a second reporting threshold.

In a tenth aspect, alone or in combination with one or more of the first through ninth aspects, the second one or more LTM candidate cells are selected from the first one or more LTM candidate cells in response to detecting an event.

In an eleventh aspect, alone or in combination with one or more of the first through tenth aspects, the event is associated with a filtered measurement value associated with an LTM candidate cell included in the second one or more LTM candidate cells, where the filtered measurement value satisfies a first reporting threshold, or is greater than a measurement value of a serving cell by an amount that satisfies a second reporting threshold.

In a twelfth aspect, alone or in combination with one or more of the first through eleventh aspects, process 900 includes transmitting a Layer 3 measurement report associated with the set of one or more cells, the first one or more LTM candidate cells being selected from the set of one or more cells in association with measurement values indicated by the Layer 3 measurement report.

In a thirteenth aspect, alone or in combination with one or more of the first through twelfth aspects, measuring the first one or more LTM candidate cells includes measuring the first one or more LTM candidate cells during an SMTC window.

In a fourteenth aspect, alone or in combination with one or more of the first through thirteenth aspects, process 900 includes measuring the second one or more LTM candidate cells to obtain the one or more measurement values in accordance with a sharing factor associated with LTM candidate cells and a serving cell.

In a fifteenth aspect, alone or in combination with one or more of the first through fourteenth aspects, the sharing factor indicates an allocation of synchronization signal block burst occasions between the serving cell and the second one or more LTM candidate cells.

In a sixteenth aspect, alone or in combination with one or more of the first through fifteenth aspects, identifying the one or more filtered measurement values includes measuring the first one or more LTM candidate cells to obtain the one or more filtered measurement values.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
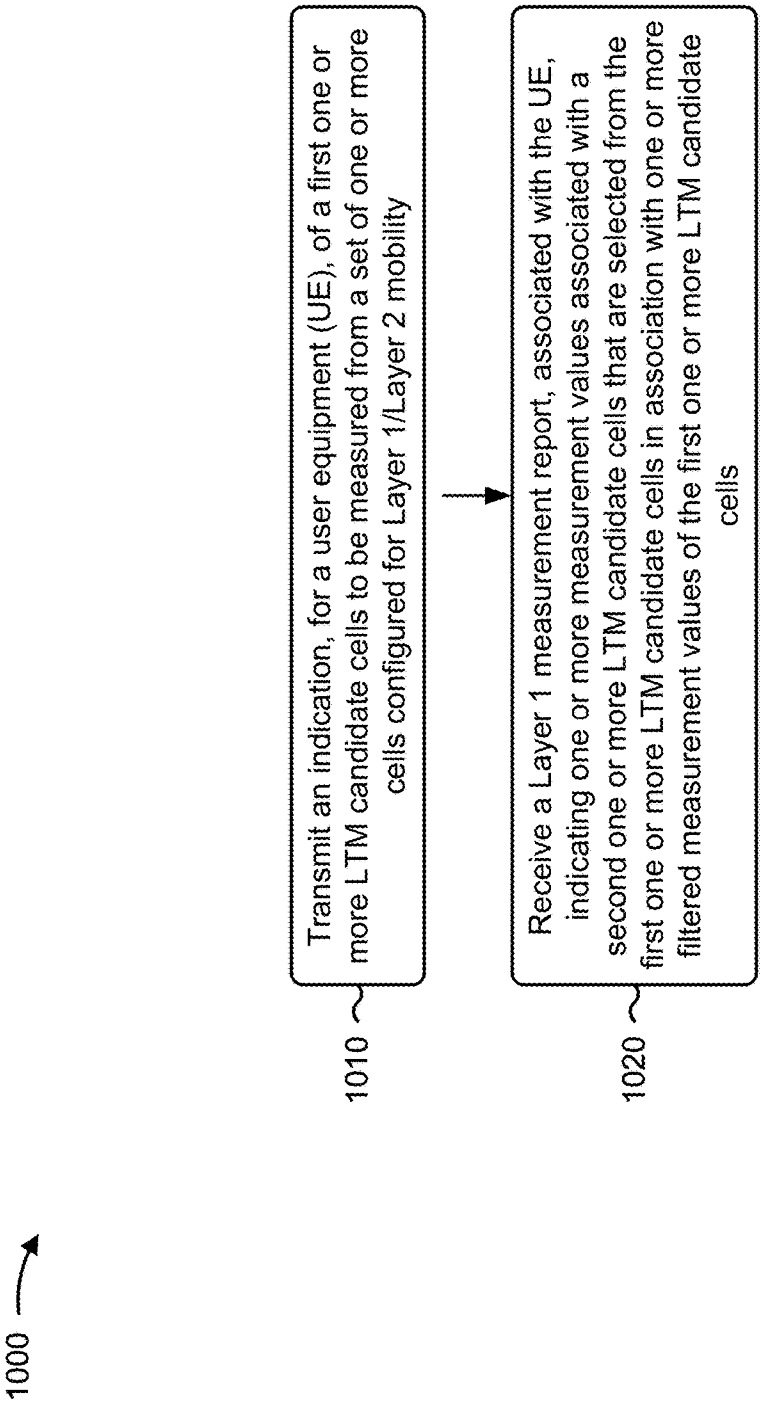
FIG. 10 is a diagram illustrating an example process performed, for example, by a network node, associated with hybrid measurements and reporting for LTM, in accordance with the present disclosure.

FIG. 10 is a diagram illustrating an example process 1000 performed, for example, by a network node, associated with hybrid measurements and reporting for LTM, in accordance with the present disclosure. Example process 1000 is an example where the network node (for example, the network node 110 and/or a DU) performs operations associated with hybrid measurements and reporting for LTM.

As shown in FIG. 10, in some aspects, process 1000 may include transmitting an indication, for a UE, of a first one or more LTM candidate cells to be measured from a set of one or more cells configured for Layer 1/Layer 2 mobility (block 1010). For example, the network node (such as using transmission component 1204 and/or communication manager 1206, depicted in FIG. 12) may transmit an indication, for a UE, of a first one or more LTM candidate cells to be measured from a set of one or more cells configured for Layer 1/Layer 2 mobility, as described above.

As further shown in FIG. 10, in some aspects, process 1000 may include receiving a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells (block 1020). For example, the network node (such as using reception component 1202 and/or communication manager 1206, depicted in FIG. 12) may receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells, as described above.

Process 1000 may include additional aspects, such as any single aspect or any combination of aspects described below and/or in connection with one or more other processes described elsewhere herein.

In a first aspect, process 1000 includes receiving a capability report, associated with the UE, indicating at least one of a first supported quantity of cells or measurement resources associated with non-serving cells included in the second one or more LTM candidate cells, or a second supported quantity of cells or measurement resources associated with the first one or more LTM candidate cells.

In a second aspect, alone or in combination with the first aspect, transmitting the indication of the first one or more LTM candidate cells includes transmitting an indication of one or more filter coefficients to be associated with the one or more filtered measurement values.

In a third aspect, alone or in combination with one or more of the first and second aspects, the one or more filter coefficients are a first one or more filter coefficients, and process 1000 includes transmitting a measurement report configuration indicating a second one or more filter coefficients to be associated with Layer 3 measurements.

In a fourth aspect, alone or in combination with one or more of the first through third aspects, first values for respective filter coefficients from the first one or more filter coefficients are greater than or equal to second values for respective filter coefficients from the second one or more filter coefficients.

In a fifth aspect, alone or in combination with one or more of the first through fourth aspects, process 1000 includes receiving a measurement report indicating the one or more filtered measurement values, the measurement report having a Layer 1 format.

In a sixth aspect, alone or in combination with one or more of the first through fifth aspects, the measurement report is a Layer 2 report.

In a seventh aspect, alone or in combination with one or more of the first through sixth aspects, the measurement report is a MAC layer report.

In an eighth aspect, alone or in combination with one or more of the first through seventh aspects, receiving the measurement report is associated with detecting an event.

In a ninth aspect, alone or in combination with one or more of the first through eighth aspects, the event is associated with at least one of the one or more filtered measurement values, where the at least one of the one or more filtered measurement values satisfies a first reporting threshold, or is greater than a measurement value of a serving cell by an amount that satisfies a second reporting threshold.

In a tenth aspect, alone or in combination with one or more of the first through ninth aspects, the second one or more LTM candidate cells are selected from the first one or more LTM candidate cells in response to detecting an event.

In an eleventh aspect, alone or in combination with one or more of the first through tenth aspects, the event is associated with a filtered measurement value associated with an LTM candidate cell included in the second one or more LTM candidate cells, where the filtered measurement value satisfies a first reporting threshold, or is greater than a measurement value of a serving cell by an amount that satisfies a second reporting threshold.

In a twelfth aspect, alone or in combination with one or more of the first through eleventh aspects, process 1000 includes receiving a Layer 3 measurement report associated with the set of one or more cells, the first one or more LTM candidate cells being selected from the set of one or more cells in association with measurement values indicated by the Layer 3 measurement report.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
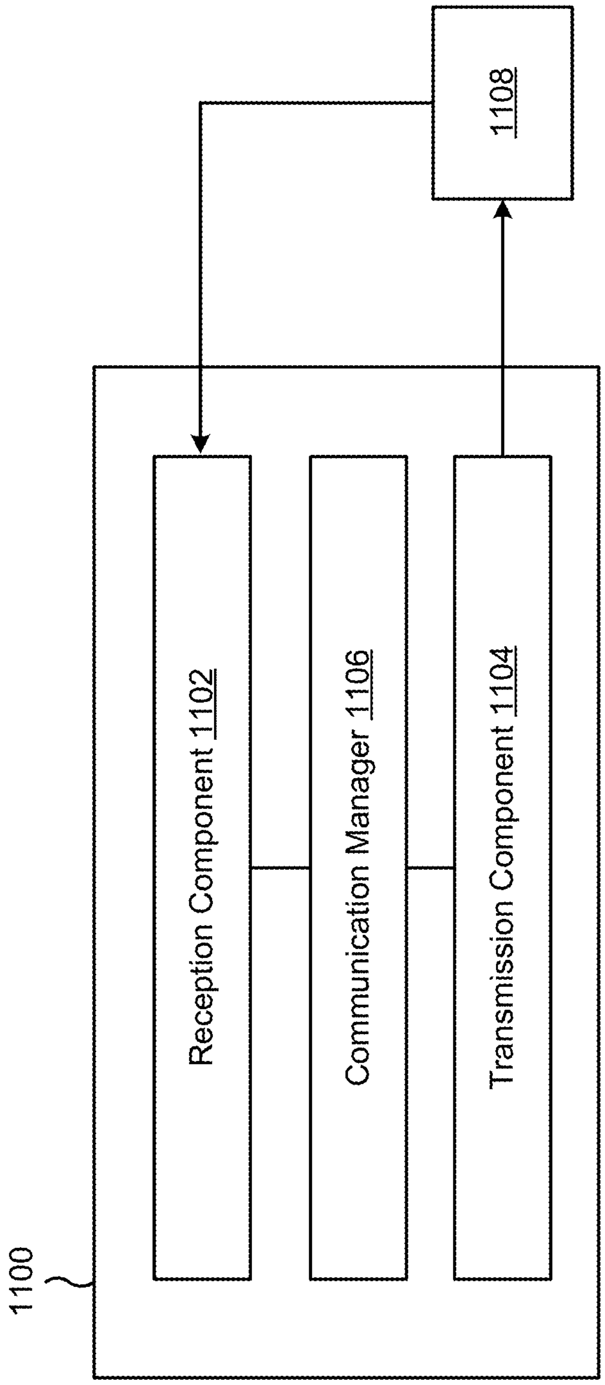
FIG. 11 is a diagram of an example apparatus for wireless communication associated with hybrid measurements and reporting for LTM, in accordance with the present disclosure.

FIG. 11 is a diagram of an example apparatus 1100 for wireless communication associated with hybrid measurements and reporting for LTM, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a network node, an indication of a first one or more LTM candidate cells to be measured from a set of one or more cells configured for Layer 1/Layer 2 mobility. The communication manager 1106 may identify one or more filtered measurement values associated with respective cells from the first one or more LTM candidate cells. The transmission component 1104 may transmit, to the network node, a Layer 1 measurement report indicating one or more measurement values associated with a second one or more LTM candidate cells that are selected from the first one or more LTM candidate cells in association with the one or more filtered measurement values.

The transmission component 1104 may transmit, to the network node, a capability report indicating at least one of a first supported quantity of cells or measurement resources associated with non-serving cells included in the second one or more LTM candidate cells, or a second supported quantity of cells or measurement resources associated with the first one or more LTM candidate cells.

The transmission component 1104 may transmit a measurement report indicating the one or more filtered measurement values, the measurement report having a Layer 1 format.

The transmission component 1104 may transmit a Layer 3 measurement report associated with the set of one or more cells, the first one or more LTM candidate cells being selected from the set of one or more cells in association with measurement values indicated by the Layer 3 measurement report.

The communication manager 1106 may measure the second one or more LTM candidate cells to obtain the one or more measurement values in accordance with a sharing factor associated with LTM candidate cells and a serving cell.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
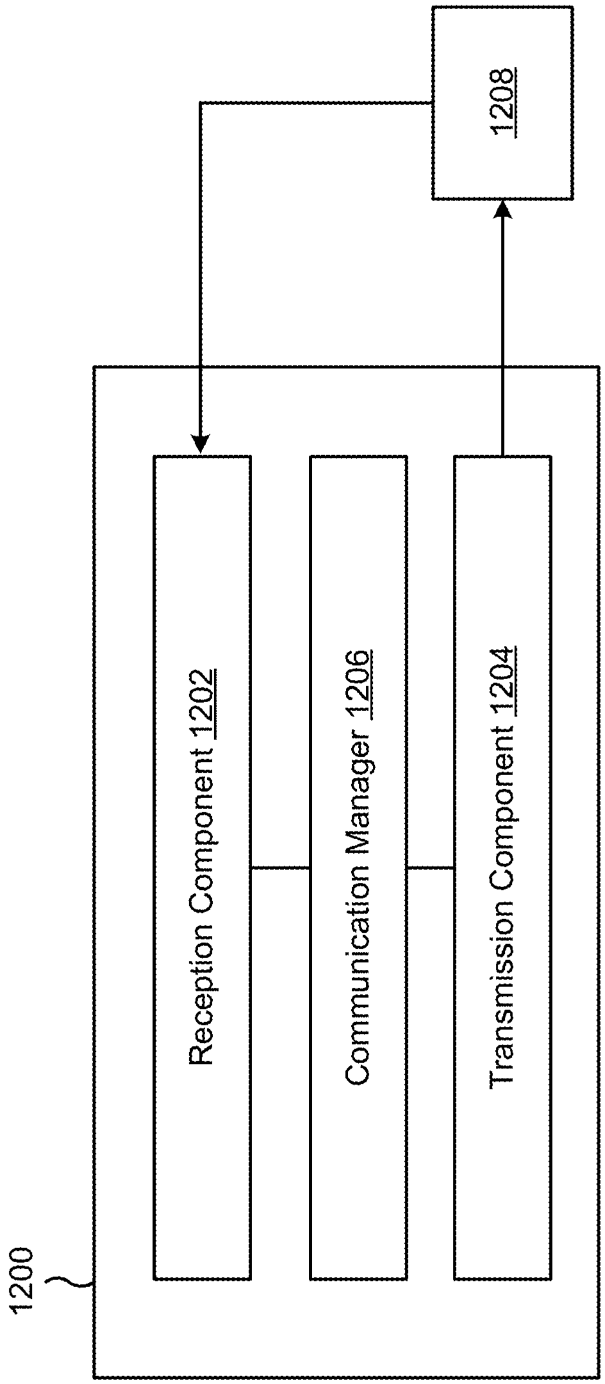
FIG. 12 is a diagram of an example apparatus for wireless communication associated with hybrid measurements and reporting for LTM, in accordance with the present disclosure.

FIG. 12 is a diagram of an example apparatus 1200 for wireless communication associated with hybrid measurements and reporting for LTM, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit an indication, for a UE, of a first one or more LTM candidate cells to be measured from a set of one or more cells configured for Layer 1/Layer 2 mobility. The reception component 1202 may receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

The reception component 1202 may receive a capability report, associated with the UE, indicating at least one of a first supported quantity of cells or measurement resources associated with non-serving cells included in the second one or more LTM candidate cells, or a second supported quantity of cells or measurement resources associated with the first one or more LTM candidate cells.

The reception component 1202 may receive a measurement report indicating the one or more filtered measurement values, the measurement report having a Layer 1 format.

The reception component 1202 may receive a Layer 3 measurement report associated with the set of one or more cells, the first one or more LTM candidate cells being selected from the set of one or more cells in association with measurement values indicated by the Layer 3 measurement report.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed at a user equipment (UE), comprising: receiving, from a network node, an indication of a first one or more Layer 1/Layer 2 triggered mobility (LTM) candidate cells to be measured from a set of one or more cells configured for Layer 1/Layer 2 mobility; identifying one or more filtered measurement values associated with respective cells from the first one or more LTM candidate cells; and transmitting, to the network node, a Layer 1 measurement report indicating one or more measurement values associated with a second one or more LTM candidate cells that are selected from the first one or more LTM candidate cells in association with the one or more filtered measurement values.

Aspect 2: The method of Aspect 1, further comprising: transmitting, to the network node, a capability report indicating at least one of: a first supported quantity of cells or measurement resources associated with non-serving cells included in the second one or more LTM candidate cells, or a second supported quantity of cells or measurement resources associated with the first one or more LTM candidate cells.

Aspect 3: The method of any of Aspects 1-2, wherein receiving the indication of the first one or more LTM candidate cells comprises: receiving an indication of one or more filter coefficients to be associated with the one or more filtered measurement values.

Aspect 4: The method of Aspect 3, wherein the one or more filter coefficients are a first one or more filter coefficients, the method further comprising: receiving a measurement report configuration indicating a second one or more filter coefficients to be associated with Layer 3 measurements.

Aspect 5: The method of Aspect 4, wherein first values for respective filter coefficients from the first one or more filter coefficients are greater than or equal to second values for respective filter coefficients from the second one or more filter coefficients.

Aspect 6: The method of any of Aspects 1-5, further comprising: transmitting a measurement report indicating the one or more filtered measurement values, the measurement report having a Layer 1 format.

Aspect 7: The method of Aspect 6, wherein the measurement report is a Layer 2 report.

Aspect 8: The method of any of Aspects 6-7, wherein the measurement report is a medium access control (MAC) layer report.

Aspect 9: The method of any of Aspects 6-8, wherein transmitting the measurement report is in response to detecting an event.

Aspect 10: The method of Aspect 9, wherein the event is associated with at least one of the one or more filtered measurement values, wherein the at least one of the one or more filtered measurement values: satisfies a first reporting threshold, or is greater than a measurement value of a serving cell by an amount that satisfies a second reporting threshold.

Aspect 11: The method of any of Aspects 1-10, wherein the second one or more LTM candidate cells are selected from the first one or more LTM candidate cells in response to detecting an event.

Aspect 12: The method of Aspect 11, wherein the event is associated with a filtered measurement value associated with an LTM candidate cell included in the second one or more LTM candidate cells, wherein the filtered measurement value: satisfies a first reporting threshold, or is greater than a measurement value of a serving cell by an amount that satisfies a second reporting threshold.

Aspect 13: The method of any of Aspects 1-12, further comprising: transmitting a Layer 3 measurement report associated with the set of one or more cells, the first one or more LTM candidate cells being selected from the set of one or more cells in association with measurement values indicated by the Layer 3 measurement report.

Aspect 14: The method of any of Aspects 1-13, wherein identifying the one or more filtered measurement values comprises: measuring the first one or more LTM candidate cells during a synchronization signal block measurement time configuration (SMTC) window.

Aspect 15: The method of any of Aspects 1-14, further comprising: measuring the second one or more LTM candidate cells to obtain the one or more measurement values in accordance with a sharing factor associated with LTM candidate cells and a serving cell.

Aspect 16: The method of Aspect 15, wherein the sharing factor indicates an allocation of synchronization signal block burst occasions between the serving cell and the second one or more LTM candidate cells.

Aspect 17: The method of any of Aspects 1-16, wherein identifying the one or more filtered measurement values comprises: measuring the first one or more LTM candidate cells to obtain the one or more filtered measurement values.

Aspect 18: A method of wireless communication performed by a network node, comprising: transmitting an indication, for a user equipment (UE), of a first one or more Layer 1/Layer 2 triggered mobility (LTM) candidate cells to be measured from a set of one or more cells configured for Layer 1/Layer 2 mobility; and receiving a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells.

Aspect 19: The method of Aspect 18, further comprising: receiving a capability report, associated with the UE, indicating at least one of: a first supported quantity of cells or measurement resources associated with non-serving cells included in the second one or more LTM candidate cells, or a second supported quantity of cells or measurement resources associated with the first one or more LTM candidate cells.

Aspect 20: The method of any of Aspects 18-19, wherein transmitting the indication of the first one or more LTM candidate cells comprises: transmitting an indication of one or more filter coefficients to be associated with the one or more filtered measurement values.

Aspect 21: The method of Aspect 20, wherein the one or more filter coefficients are a first one or more filter coefficients, the method further comprising: transmitting a measurement report configuration indicating a second one or more filter coefficients to be associated with Layer 3 measurements.

Aspect 22: The method of Aspect 21, wherein first values for respective filter coefficients from the first one or more filter coefficients are greater than or equal to second values for respective filter coefficients from the second one or more filter coefficients.

Aspect 23: The method of any of Aspects 18-22, further comprising: receiving a measurement report indicating the one or more filtered measurement values, the measurement report having a Layer 1 format.

Aspect 24: The method of Aspect 23, wherein the measurement report is a Layer 2 report.

Aspect 25: The method of any of Aspects 23-24, wherein the measurement report is a medium access control (MAC) layer report.

Aspect 26: The method of any of Aspects 23-25, wherein receiving the measurement report is associated with detecting an event.

Aspect 27: The method of Aspect 26, wherein the event is associated with at least one of the one or more filtered measurement values, wherein the at least one of the one or more filtered measurement values: satisfies a first reporting threshold, or is greater than a measurement value of a serving cell by an amount that satisfies a second reporting threshold.

Aspect 28: The method of any of Aspects 18-27, wherein the second one or more LTM candidate cells are selected from the first one or more LTM candidate cells in response to detecting an event.

Aspect 29: The method of Aspect 28, wherein the event is associated with a filtered measurement value associated with an LTM candidate cell included in the second one or more LTM candidate cells, wherein the filtered measurement value: satisfies a first reporting threshold, or is greater than a measurement value of a serving cell by an amount that satisfies a second reporting threshold.

Aspect 30: The method of any of Aspects 18-29, further comprising: receiving a Layer 3 measurement report associated with the set of one or more cells, the first one or more LTM candidate cells being selected from the set of one or more cells in association with measurement values indicated by the Layer 3 measurement report.

Aspect 31: An apparatus for wireless communication at a device, comprising a processor; memory coupled with the processor; and instructions stored in the memory and executable by the processor to cause the apparatus to perform the method of one or more of Aspects 1-17.

Aspect 32: A device for wireless communication, comprising a memory and one or more processors coupled to the memory, the one or more processors configured to perform the method of one or more of Aspects 1-17.

Aspect 33: An apparatus for wireless communication, comprising at least one means for performing the method of one or more of Aspects 1-17.

Aspect 34: A non-transitory computer-readable medium storing code for wireless communication, the code comprising instructions executable by a processor to perform the method of one or more of Aspects 1-17.

Aspect 35: A non-transitory computer-readable medium storing a set of instructions for wireless communication, the set of instructions comprising one or more instructions that, when executed by one or more processors of a device, cause the device to perform the method of one or more of Aspects 1-17.

Aspect 36: An apparatus for wireless communication at a device, comprising a processor; memory coupled with the processor; and instructions stored in the memory and executable by the processor to cause the apparatus to perform the method of one or more of Aspects 18-30.

Aspect 37: A device for wireless communication, comprising a memory and one or more processors coupled to the memory, the one or more processors configured to perform the method of one or more of Aspects 18-30.

Aspect 38: An apparatus for wireless communication, comprising at least one means for performing the method of one or more of Aspects 18-30.

Aspect 39: A non-transitory computer-readable medium storing code for wireless communication, the code comprising instructions executable by a processor to perform the method of one or more of Aspects 18-30.

Aspect 40: A non-transitory computer-readable medium storing a set of instructions for wireless communication, the set of instructions comprising one or more instructions that, when executed by one or more processors of a device, cause the device to perform the method of one or more of Aspects 18-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:

one or more memories storing processor-executable code; and one or more processors coupled with the one or more memories, at least one processor of the one or more processors configured to cause the UE to:

receive, from a network node, an indication of a first one or more Layer 1/Layer 2 triggered mobility (LTM) candidate cells to be measured from a set of one or more cells configured for Layer 1/Layer 2 mobility;

identify one or more filtered measurement values associated with respective cells from the first one or more LTM candidate cells;

transmit, to the network node, a Layer 1 measurement report indicating one or more measurement values associated with a second one or more LTM candidate cells that are selected from the first one or more LTM candidate cells in association with the one or more filtered measurement values; and receive an indication of one or more filter coefficients to be associated with the one or more filtered measurement values.

2. The apparatus of claim 1, wherein at least one processor of the one or more processors is configured to cause the UE to:

transmit, to the network node, a capability report indicating at least one of:

a first supported quantity of cells or measurement resources associated with non-serving cells included in the second one or more LTM candidate cells, or a second supported quantity of cells or measurement resources associated with the first one or more LTM candidate cells.

3. The apparatus of claim 1, wherein at least one processor of the one or more processors is configured to cause the UE to:

receive a measurement report configuration indicating a second one or more filter coefficients to be associated with Layer 3 measurements.

4. The apparatus of claim 1, wherein at least one processor of the one or more processors is configured to cause the UE to:

transmit a measurement report indicating the one or more filtered measurement values, the measurement report having a Layer 1 format.

5. The apparatus of claim 1, wherein the second one or more LTM candidate cells are selected from the first one or more LTM candidate cells in response to detecting an event.

6. The apparatus of claim 5, wherein the event is associated with a filtered measurement value associated with an LTM candidate cell included in the second one or more LTM candidate cells, wherein the filtered measurement value:

satisfies a first reporting threshold, or is greater than a measurement value of a serving cell by an amount that satisfies a second reporting threshold.

7. The apparatus of claim 1, wherein at least one processor of the one or more processors is configured to cause the UE to:

transmit a Layer 3 measurement report associated with the set of one or more cells, the first one or more LTM candidate cells being selected from the set of one or more cells in association with measurement values indicated by the Layer 3 measurement report.

8. The apparatus of claim 1, wherein at least one processor of the one or more processors is configured to cause the UE to:

measure the second one or more LTM candidate cells to obtain the one or more measurement values in accordance with a sharing factor associated with LTM candidate cells and a serving cell.

9. The apparatus of claim 8, wherein the sharing factor indicates an allocation of synchronization signal block burst occasions between the serving cell and the second one or more LTM candidate cells.

10. The apparatus of claim 1, wherein at least one processor of the one or more processors is configured to cause the UE to:

transmit a capability report indicating that the UE supports using the one or more filtered measurement values for the Layer 1 measurement report.

11. An apparatus for wireless communication at a network node, comprising:

one or more memories storing processor-executable code; and one or more processors coupled with the one or more memories, at least one processor of the one or more processors configured to cause the network node to:

transmit an indication, for a user equipment (UE), of a first one or more Layer 1/Layer 2 triggered mobility (LTM) candidate cells to be measured from a set of one or more cells configured for Layer 1/Layer 2 mobility;

receive a Layer 1 measurement report, associated with the UE, indicating one or more measurement values associated with a second one or more LTM candidate cells that are selected from the first one or more LTM candidate cells in association with one or more filtered measurement values of the first one or more LTM candidate cells; and transmit an indication of one or more filter coefficients to be associated with the one or more filtered measurement values.

12. The apparatus of claim 11, wherein at least one processor of the one or more processors is configured to cause the network node to:

receive a capability report, associated with the UE, indicating at least one of:

a first supported quantity of cells or measurement resources associated with non-serving cells included in the second one or more LTM candidate cells, or a second supported quantity of cells or measurement resources associated with the first one or more LTM candidate cells.

13. The apparatus of claim 11, wherein at least one processor is configured to cause the network node to:

receive a measurement report indicating the one or more filtered measurement values, the measurement report having a Layer 1 format.

14. A method of wireless communication performed at a user equipment (UE), comprising:

receiving, from a network node, an indication of a first one or more Layer 1/Layer 2 triggered mobility (LTM) candidate cells to be measured from a set of one or more cells configured for Layer 1/Layer 2 mobility;

identifying one or more filtered measurement values associated with respective cells from the first one or more LTM candidate cells; and transmitting, to the network node, a Layer 1 measurement report indicating one or more measurement values associated with a second one or more LTM candidate cells that are selected from the first one or more LTM candidate cells in association with the one or more filtered measurement values;

wherein transmitting the measurement report is in response to detecting an event;

wherein the event is associated with at least one of the one or more filtered measurement values, wherein the at least one of the one or more filtered measurement values:

satisfies a first reporting threshold, or is greater than a measurement value of a serving cell by an amount that satisfies a second reporting threshold.

15. The method of claim 14, further comprising:

transmitting, to the network node, a capability report indicating at least one of:

a first supported quantity of cells or measurement resources associated with non-serving cells included in the second one or more LTM candidate cells, or a second supported quantity of cells or measurement resources associated with the first one or more LTM candidate cells.

16. The method of claim 14, further comprising: transmitting a measurement report indicating the one or more filtered measurement values, the measurement report having a Layer 1 format.

* * * * *